United States Patent [19]

Beckham

[11] 3,948,719

[45] Apr. 6, 1976

[54] MIRROR MOUNT APPLYING METHOD AND APPARATUS

[75] Inventor: Robert R. Beckham, Toledo, Ohio

[73] Assignee: Libbey-Owens-Ford Company, Toledo, Ohio

[22] Filed: Jan. 30, 1975

[21] Appl. No.: 545,529

[52] U.S. Cl. ................ 156/556; 156/320; 156/322; 156/566; 156/580

[51] Int. Cl.$^2$ .................... B32B 31/00; B65H 29/00

[58] Field of Search ........... 156/320, 322, 556, 566, 156/567, 569, 580

[56] References Cited

UNITED STATES PATENTS

| | | | |
|---|---|---|---|
| 3,274,662 | 9/1966 | Jackman et al. | 156/556 |
| 3,823,050 | 7/1974 | LaMers | 156/566 |
| 3,880,692 | 4/1975 | Jeffries | 156/566 |

*Primary Examiner*—William A. Powell
*Assistant Examiner*—Brian J. Leitten
*Attorney, Agent, or Firm*—Collins, Oberlin & Darr

[57] ABSTRACT

A method of and apparatus for applying and securing mirror mounts to the inboard surfaces of windshields. The apparatus includes means for optically scanning the surface of the windshield and detecting the presence of antenna wires or other markings therein to be used as reference points for the placement of a mirror mount on the windshield. The apparatus also includes means responsive to such detecting means for placing and affixing a mirror mount on the windshield in a desired region thereon.

35 Claims, 20 Drawing Figures

MIRROR MOUNT APPLYING METHOD AND APPARATUS

BACKGROUND OF THE INVENTION

The present invention relates generally to the production of laminated glass windshields and, more particularly, to a method of and apparatus for automatically affixing rear view mirror mounting anchor devices or mounts in a precise location on the inboard surfaces of such windshields.

The placement of anchoring devices or mounts on the inboard surfaces of windshields for the attachment thereto of rear view mirrow assemblies is well know. Generally, these mounts are formed of metal bodies having mirror attaching fastening arrangements and are provided with a layer of heat and pressure sensitive plastic material on one face thereof for permanently bonding the mount to the inner surface of the inboard lite of the windshield. One known procedure in affixing such mirror mounts to the inner surfaces of windshields involves the use of manually operated hand tools after the windshield has been completely assembled with the component parts thereof at least partially bonded to each other. This assembled windshield is advanced on a conveyor system and the above mentioned hand-operated tool, also mounted on the conveyor, is clamped about the mount and the opposite side of the windshield for a period of time during the advancement of the windshield on the conveyor system to apply the necessary heat and pressure to effect the bond. A tool for each windshield is required as the windshields are advanced in spaced relation on the conveyor and from three to five attendants are required to perform the necessary operations. It can be readily appreciated that such manual operations seriously impair efficiency in a mass production operation, adding materially to production costs. Also, the attendant fatigue and human error in performing such arduous tasks often results in the placement of the mounts off center of the windshield thereby locating the rear view mirror in a position which does not offer optimum viewing area.

Sometimes, locator devices are employed to properly position the mount centrally of the opposite transverse edges of the windshield and a predetermined distance from the upper or top edge of the windshield. The use of such devices further encumber production, also adding to production costs.

SUMMARY OF THE INVENTION

Accordingly, it is a primary object of the present invention to obviate the above-noted disadvantages by providing a new and useful method of and apparatus for automatically precisely positioning and affixing mirror mounts on windshields rapidly, smoothly, and with the precision essential to meet production requirements in the automotive field.

Another object of this invention is to provide a new and useful apparatus for permanently applying mirror mounts to the inner surfaces of windshields as part of a substantially continuous assembly operation.

Still another object of the present invention is the accurate positioning of the mirror mount on the windshield regardless of the windshield size or the random placement thereof on the incoming conveyor of the assembly line.

A further object of this invention is to provide in the foregoing mirror mount applying apparatus, a novel arrangement for feeding the mirror mounts singly from a supply of such mounts and heating the same prior to the placement thereof on a windshield surface.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DESCRIPTION OF THE PREFERRED EMBODIMENT

Figure 1:
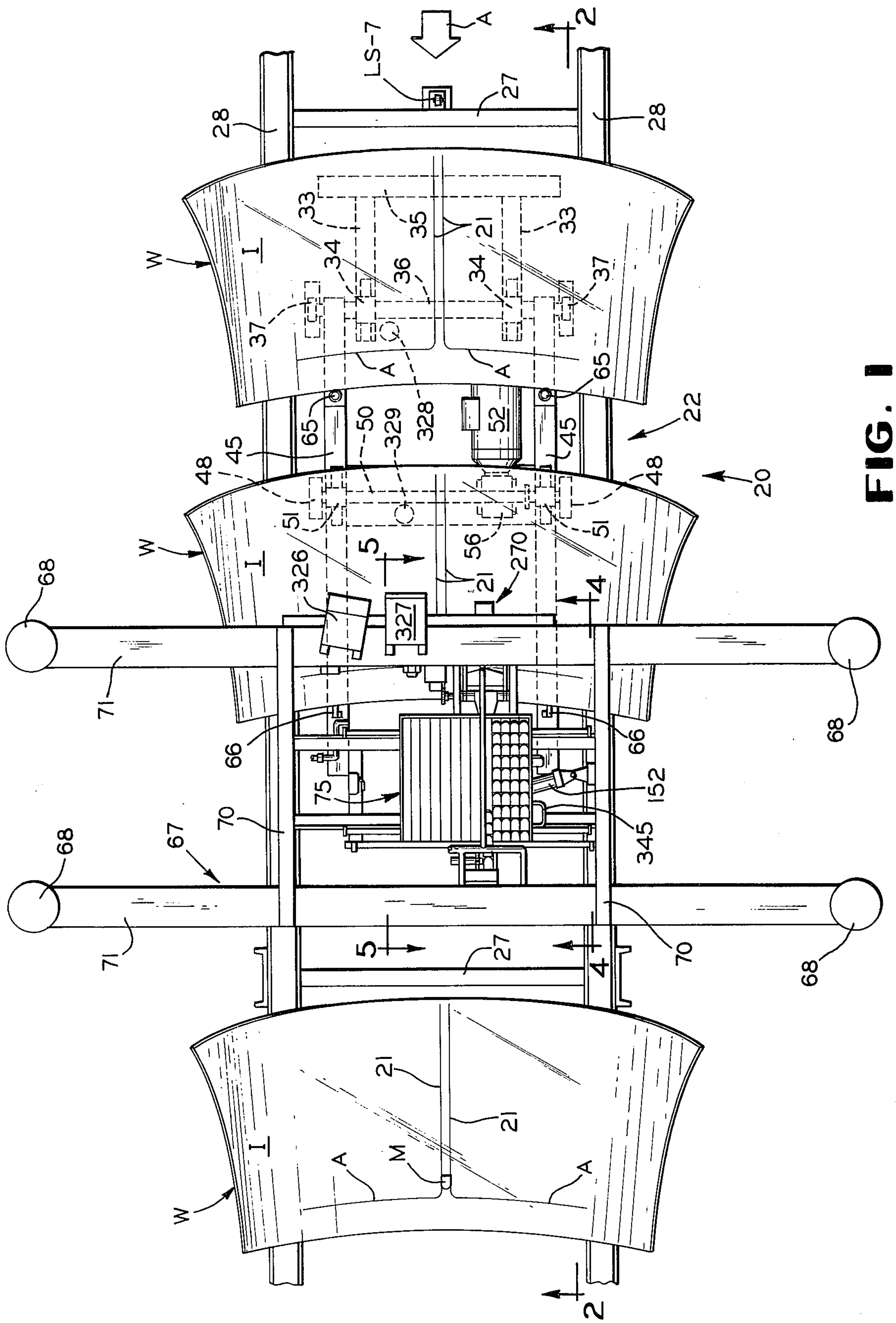
FIG. 1 is a top plan view of a mirror mount applying apparatus constructed in accordance with the principles of this invention.
Figure 2:
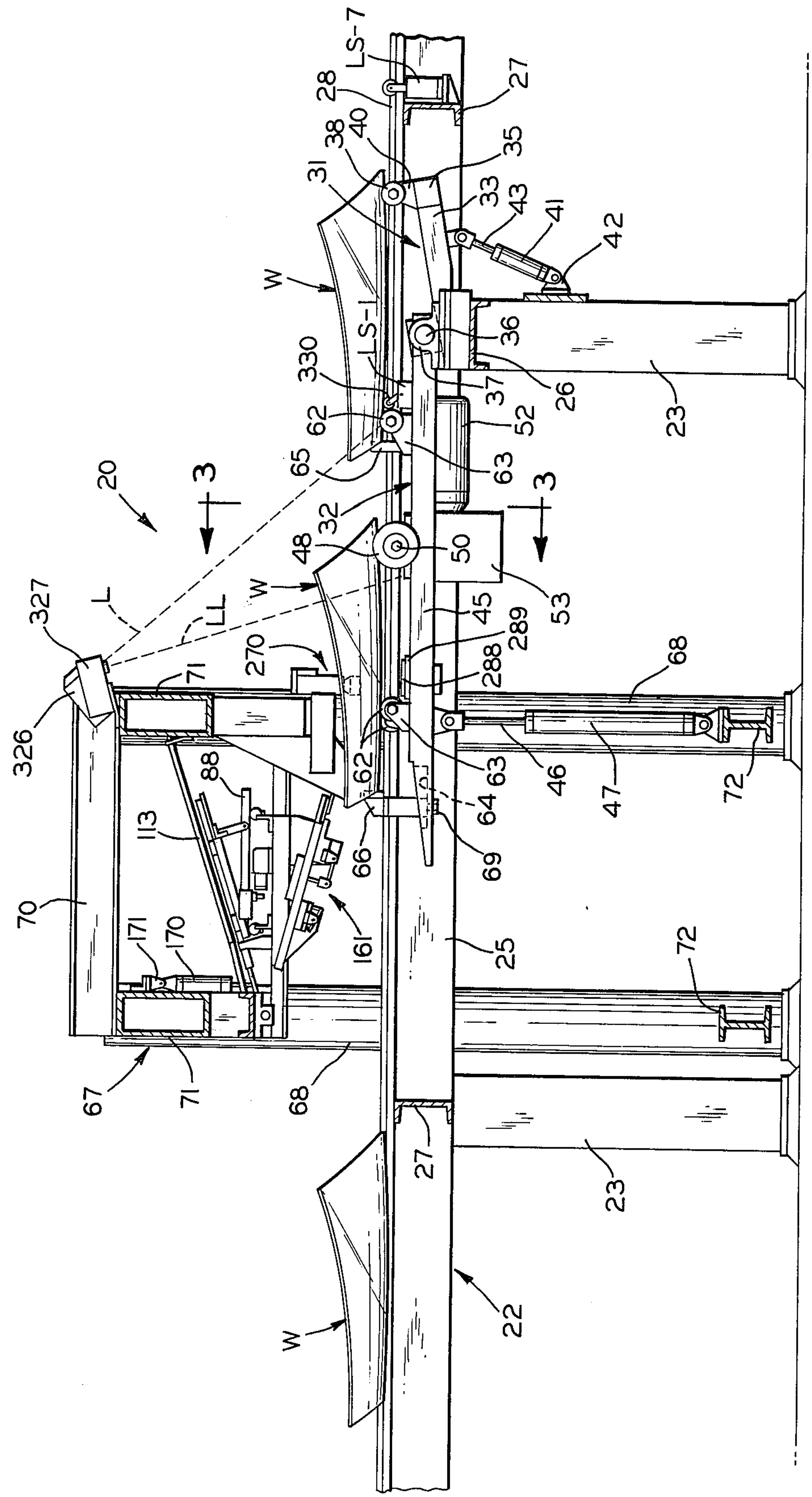
FIG. 2 is a vertical sectional view, taken along the line 2—2 of FIG. 1, showing the elevators for lifting the windshields off the assembly conveyor line.

Referring now in detail to the illustrated embodiment depicted in the accompanying drawings, there is shown in FIGS. 1 and 2 a mirror mount applying apparatus, comprehensively designated 20, constructed in accordance with this invention for automatically positioning and securing rear view mirror mounting devices, hereinafter referred to as mirror mounts M, on glass windshields W. The apparatus 20, which forms an integral part of a substantially continuous windshield assembly line operation in the illustrated embodiment, receives the windshield assembly after the component parts thereof have been loosely assembled and prior to the bonding of the same by heat and pressure. However, apparatus 20 can be a self-contained unit located in close proximity to or further downstream of the assembly line, if desired, such as at a location behind the prepressing station for example.

Figure 18:
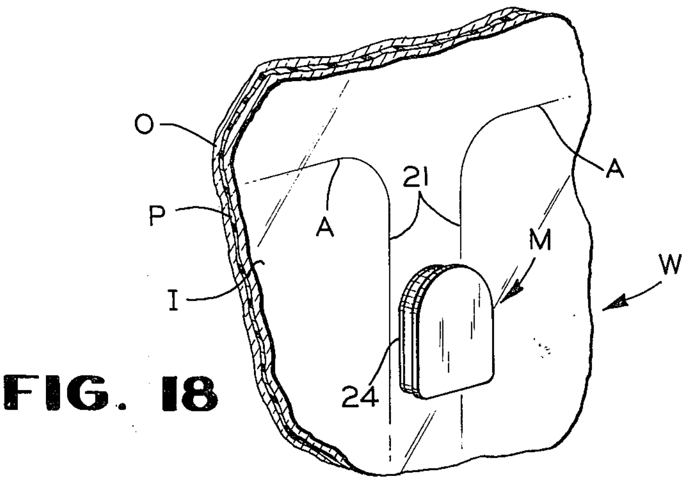
FIG. 18 is a fragmentary, perspective view of a portion of a windshield with a rear view mirror mount attached to the inner surface thereof.

Referring now to FIG. 18, a typical form of windshield W of the built-in antenna type comprises complementary shaped inboard and outboard glass sheets I and O having a plastic interlayer P sandwiched therebetween with a pair of substantially inverted L-shaped lengths of antenna wires A embedded in the plastic interlayer. The vertical leg portions 21 of the antenna wires are positioned in a back-to-back relation and, as hereinafter more fully explained, are used as reference lines in accurately locating the mirror mount on the inner surface of the windshield. While it will be convenient to describe the apparatus of this invention in connection with windshields having built-in antenna wires, it should be understood that the apparatus of this invention is not restricted thereto, but has utility in applying mirror mounts or the like to conventional windshields and/or any other single or multiple layers glazing closures desired. In such applications, the windshields or glazing closures can be marked with temporary, removable reference lines or other suitable indicia, as desired.

The typical mirror mount M comprises a generally rectangularly shaped, metallic body having an arcuately shaped upper end and is adapted to receive the case or frame of a mirror assembly in a manner permitting the mirror to be angularly adjusted according to the viewing position desired by the driver or other occupant of the vehicle. The mount is attached to the inner surface of the windshield before the latter is installed in its functional position within a vehicle body and, in accordance with this invention, is applied and attached to the windshield in the desired position by means of the apparatus 20. To facilitate attachment, the inner face of the mirror mount M is provided with a layer of plastic material 24 adapted to be heated for permanently bonding the mirror mount to the windshield.

Apparatus 20 comprises a frame 22 including a plurality of upstanding support posts 23 connected at their upper ends by external, longitudinally extending and laterally spaced horizontal structural members 25 of substantially hollow beam construction. The posts 23 are arranged in transverse relation to one another and are interconnected by suitable transversely extending cross members 26 while the horizontal structural members 25 are connected by transversely extending channel members 27.

Figure 3:
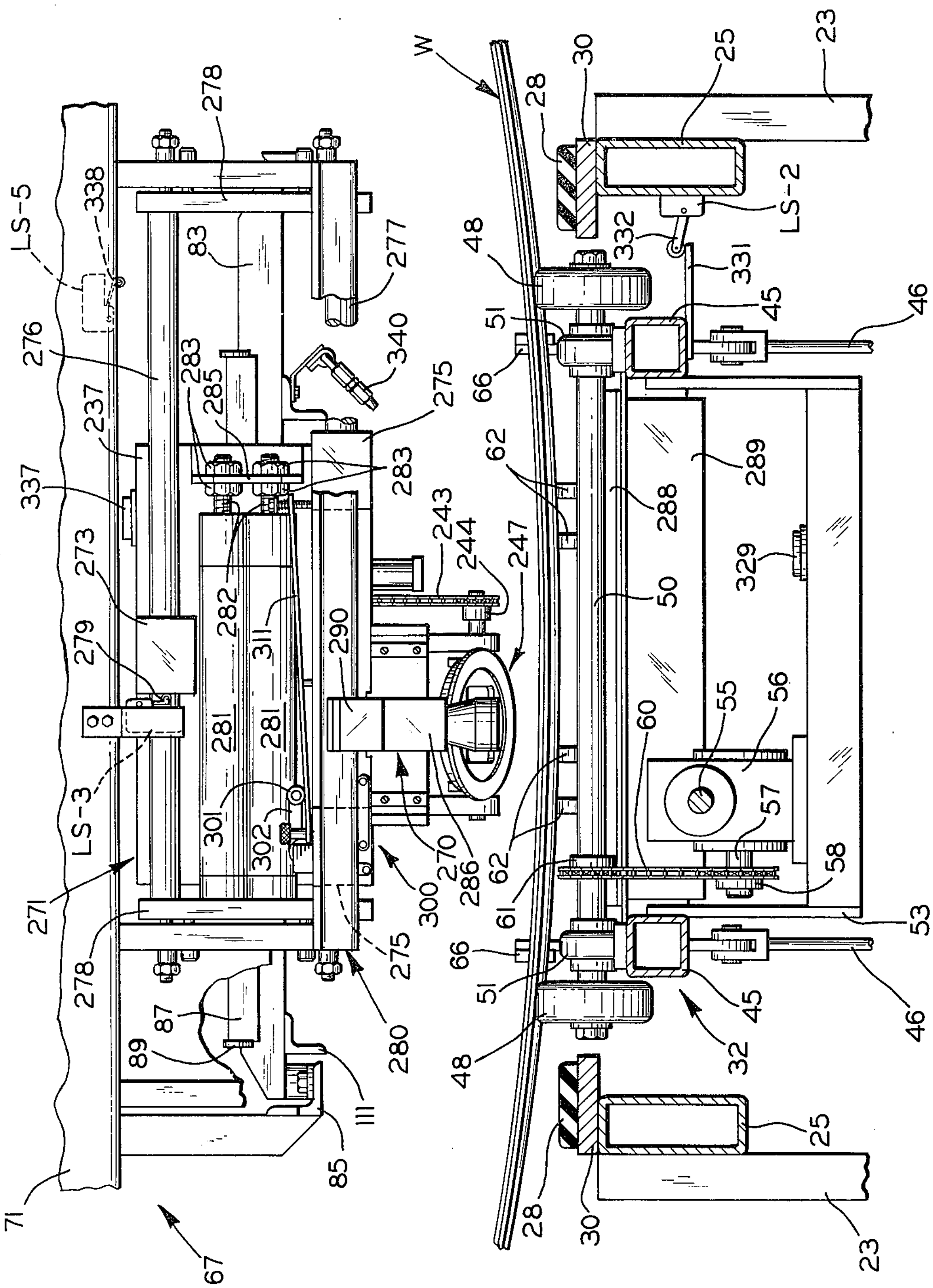
FIG. 3 is a vertical cross sectional view, on an enlarged scale, taken along line 3—3 of FIG. 2, showing the carriage and scanning device carried thereby for detecting the antenna wires in the windshield.
Figure 4:
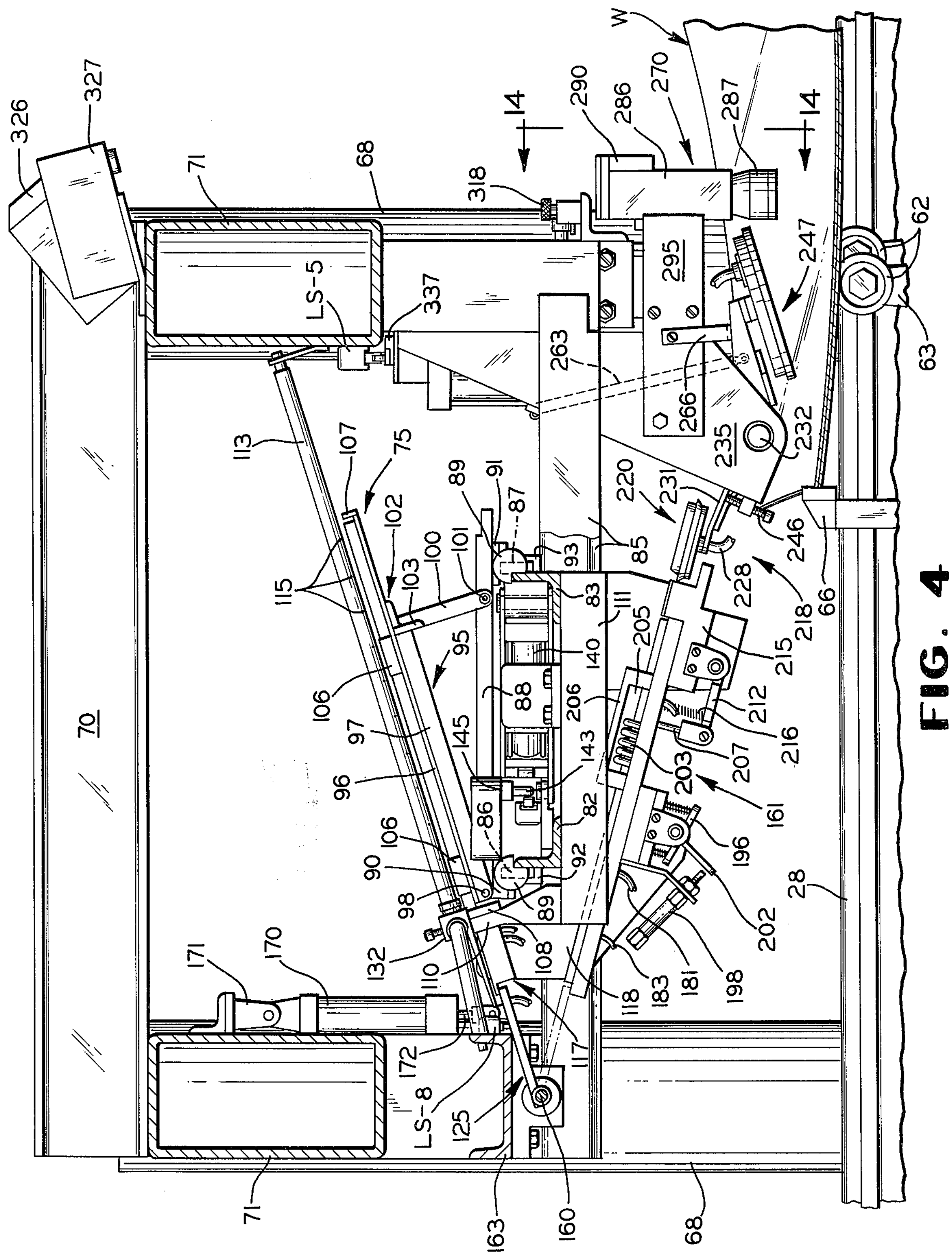
FIG. 4 is a vertical sectional view, on an enlarged scale, taken along the line 4—4 of FIG. 1, showing the mirror mount feeding and heating arrangement.

The assembled windshields W are inversely supported in a manner positioning the inboard sheet of glass I upwardly and are successively advanced, one by one, along the assembly line in a horizontal path with the longitudinal axes of the windshields extending transversely of such path. The windshields are advanced on a pair of endless conveyor belts 28 extending parallel to the longitudinal axis of apparatus 20 and trained about drive and idler pulleys (not shown) in a well known manner. The conveyor belts 28 are driven in unison by a separate motor and have an active run that passes through apparatus 20. As shown in FIG. 3, the conveyor belts 28 are supported on guide rails 30 secured to the upper ends of structural members 25.

Means are provided for lifting the windshields from conveyor belts 28 and properly locating the same relative to the mirror mount applying apparatus 20. Such means includes a first or outboard elevator, generally designated 31, and a second or inboard elevator, generally designated 32. The outboard elevator 31 comprises a pair of laterally spaced arms 33 connected at their forward ends to a transversely extending lift bar 35 and pivotally mounted at their rearward ends, by means of bearings 34, on a transversely extending shaft 36 journalled for rotation in spaced bearing blocks 37. A pair of windshield engaging idler rollers 38 are journalled on upright extensions 40 formed adjacent the opposite ends of the lift bar 35. The lift bar 35 is vertically movable by a pair of fluid actuators 41 (only one of which is shown in FIG. 2) mounted by brackets 42 on posts 23 and having extensible piston rods 43 connected to the lower end of lift bar 35 for raising and lowering the lift bar rollers 38 between a lower position beneath conveyor belts 28 and an upper position thereabove for lifting the trailing end of a windshield W from the conveyor belts 28.

The inboard elevator 32 comprises a frame construction including a pair of longitudinally extending, laterally spaced beams 45 pivotally mounted at their outer ends on shaft 36. The inner ends of beams 45 are supported on the piston rods 46 of fluid actuators 47 pivotally connected at their head ends to the apparatus frame. A pair of drive rolls 48 (FIG. 3) are mounted on the opposite ends of a transversely extending drive shaft 50 suitably journalled in spaced bearing blocks 51 and driven by an electric motor 52 mounted on suitable supporting structure 53 carried by the beams 45 and connected to a suitable source of electrical power (not shown). Motor 52 is provided with an output shaft 55 connected, through a suitable gear reduction mechanism 56, to a laterally projecting shaft 57 (FIG. 3) having a drive pinion 58 secured thereto. An endless drive chain 60 is trained about pinion 58 and a pinion 61 affixed to the shaft 50 for rotating the latter and the drive rolls 48.

A plurality of windshield engaging idler rolls 62 also are mounted on the framework defined by beams 45 and the cross members extending therebetween by means of upstanding brackets 63. A pair of forward stop members 65 and a pair of adjustable rearward stop members 66 are carried on the beams 45 for locating successive windshields W at longitudinally spaced positions, such as shown in FIGS. 1 and 2. The forward stop members 65 interrupt advancement of the second windshield until the first has been cycled and released and the rearward stop members 66 properly locate the leading edge of the first windshield relative to the mount applying apparatus (hereinafter described) to assure accurate placement of the mirror mount at a predetermined distance from such leading edge. To accommodate windshields of greater or lesser transverse dimensions and still maintain the desired relationship between the mount applying apparatus and the windshield leading edge, the stops 66 are adjustable longitudinally along beams 45. To this end, longitudinally extending channels or guideways 64 (FIG. 2) are formed in the beams 45 for receiving the lower ends of stops 66, which can be secured in their selected adjusted positions by screws 69 extending upwardly through suitable slots provided in the beams 45 and threaded into tapped openings formed in the bottoms of the stops 66.

The mirror mount applying apparatus 20 is supported on a gallows-type main frame 67, which includes two substantially vertically disposed columns 68 located at each side of the conveyor system and spaced longitudinally therealong with the columns 68 on opposite sides of the conveyor being laterally aligned. The columns 68 extend upwardly above the conveyor system and are tied together at their upper ends by longitudinally extending beams 70. The laterally aligned columns 68 are also connected at their upper and lower ends by transversely extending hollow beams 71 and I-beams 72, respectively, secured at their opposite ends to the columns 68 to form a rigid box-like structure.

Figure 6:
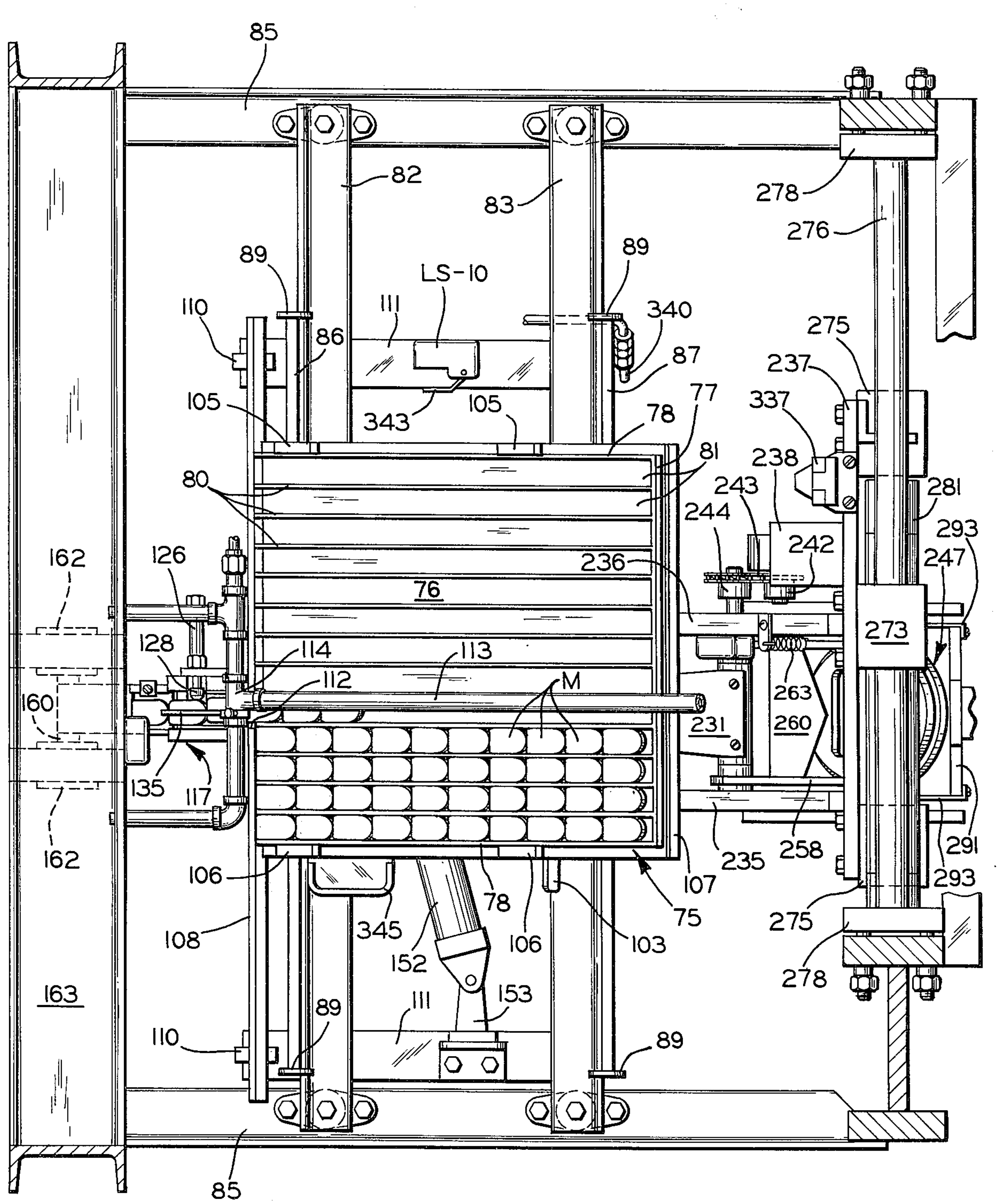
FIG. 6 is a fragmentary top plan view, on an enlarged scale, showing the tray for containing the mirror mounts and the means for indexing the same.

As best shown in FIG. 6, means in the form of a removable container or tray 75 is provided for storing the mounts M, which are ultimately fed to and affixed upon the windshield W. Tray 75 is formed of a suitable metal and comprises a bottom wall 76, a rear wall 77, and a pair of opposite side walls 78. A plurality of elongated, laterally spaced partitions 80 extending parallel to the side walls 78 are provided to separate the tray into a plurality of compartments or chutes 81 each adapted to contain a plurality of mirror mounts M in a stacked end-to-end relation.

As best shown in FIGS. 4, 5, 6, and 9, the means for supporting tray 75 includes a pair of laterally spaced, elongated angle members 82 and 83 extending transversely of the apparatus 20 and attached at their opposite ends to longitudinally extending structural members 85. A pair of track members 86 and 87 are welded or otherwise fixedly secured to angle members 82 and 83 for slidingly supporting a movable base member 88 having shoes 90 and 91 riding on track members 86 and 87. A pair of stops 89 are provided adjacent the opposite ends of track members 86 and 87 for limiting transverse sliding movement of the base member 88 on the tracks. A pair of hold down brackets 92 and 93 (FIG. 9) are secured to the bottom of shoes 90 and 91 and have portions projecting beneath their associated track members for limiting relative vertical movement between the base and track members 86 and 87.

A tiltable tray supporting table 95 having a flat planar surface 96 and a pair of depending side skirts 97, is pivotally mounted on base member 88 by means of a pivot pin 98 extending through aligned openings formed in the skirts 97 and transversely across the forward end of base member 88. Thus, table 95 is tiltable into an inclined position for gravity feeding the mirror mounts M downwardly therefrom through the front open end of the chutes 81. Table 95 is supported in the desired inclined position by means of laterally spaced levers 100 pivotally mounted at their one ends, as at 101, on base member 88 and connected at their other ends to a trasversely extending angle member 102 having one of its legs serving as a seat for the bottom of table 95. The angle member 102 projects laterally beyond one of the levers 100 to provide a handle 103 (FIG. 6) for manually swinging the levers 100 between the lower rest position and an upper, table supporting position.

Figure 7:
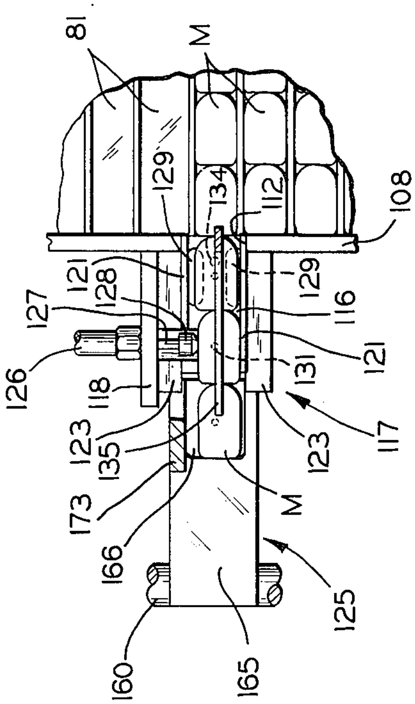
FIG. 7 is a fragmentary top plan view, illustrating a row of mirror mounts being discharged from the tray of FIG. 6.

The tray 75 is held against lateral movement on table 95 by paired aligned blocks 105 and 106 located on the opposite sides of table 95 and projecting upwardly therefrom. A retainer bar 107 extends transversely across the rear end of table 95 to prevent rearward sliding movement of tray 75 off the table 95. As best shown in FIGS. 6 and 7, barrier means in the form of a fence 108 extends transversely across the open front end of tray 75 to retain the mirror mounts M within their respective chutes 81 and is supported adjacent its opposite ends by upstanding posts 110 secured to longitudinally extending angle members 111, which are secured to and depend from the angle members 82 and 83. However, the fence 108 is provided with a cut-out section defining an outlet 112 for the discharge of a row of mirror mounts M from the chute 81 aligned therewith. An elongated conduit 113, suitably supported above the tray 75 and connected via supply line 114 to a suitable source of air under pressure (not shown), extends in a generally longitudinal direction in registry with outlet 112 so as to be disposed in substantial longitudinal alignment with the chute 81 being emptied through outlet 112. Conduit 113 is provided with a plurality of longitudinally spaced orifices 115 for directing air against the stacked mounts M and assist in gravity feeding the same downwardly along the chute 81.

The mounts M exiting chute 81 through the fence outlet 112 are received on the upper surface 116 of a support block or inclined ramp 117, the surface 116 being angularly inclined and co-planar with the upper surface of the chutes 81. The support block 117 is supported on a bracket 118 connected to an upright support plate 120 affixed to the supporting structure and is provided with laterally spaced, upwardly projecting guide rails 121 (FIG. 7) defining a channel in registry with chute 81. The upper end of block 117 is provided with a lip 122 seating on the lower edge of that portion of fence 108 defining the outlet 112 and the lower end is provided with laterally spaced extensions 123 adapted to rest on the leading edge of a pivotal transfer arm 125 when it its upper position as shown in phantom in FIG. 9.

As shown in FIG. 7, a solenoid-operated cylinder 126 is mounted on bracket 118 and is provided with a reciprocal piston rod 127 having a stop member 128 secured to the distal end thereof and engageable with the leading mount M on block 117 for restraining the same in place in the channel formed on block 117 and interrupting the advancement of mounts M therebehind. When piston rod 127 is retracted to release the stop member 128, the mount M is free to slide downwardly from block 117 by gravity, such movement being assisted by air flotation means including a supply line 130 (FIG. 9) connected to a suitable source of air under pressure (not shown) and communicating with passages 131 leading to the upper surface 116 of block 117 beneath the mounts M located thereon. In order to prevent displacement of the mounts upwardly from between guide rails 121, a guide member 132 is mounted, as by means of a set screw 133, on supply line 114. The guide member 132 is provided with an elongated finger 135 extending longitudinally of the block channel in overlying, slightly spaced, relation to the mounts and projecting axially over the leading edge of transfer arm 125.

A pair of electrical contacts 129 are located on the upper surface 116 of support block 117 adjacent the upper end thereof for sensing the presence of a mount M thereon for a purpose that will hereinafter be explained. Also, a sensor tube 134, leading to the upper surface 116 of block 117, is employed as a precautionary measure to sense the presence of a mount M thereon in the event of failure of the contacts 129 and associated circuitry.

Means, responsive to the signal means indicating the absence of a mount M on support block 117, are provided for indexing tray 75 transversely along track members 86 and 87 to present successive chutes 81 and thereby rows of mounts M to the discharge outlet 112. Referring now in detail to FIGS. 6, 9, 12, and 13, such means includes a pivotal arm assembly formed of a pair of vertically spaced swivel plates 136 located beneath member 88 and mounted for horizontal pivotal movement about a vertical pivot pin 137 (FIG. 12) connected to a block 138, in turn secured to angle member 83. A fluid cylinder 140 is suitably mounted between the swivel plates 136 and is provided with a reciprocal piston rod 141 having a bifurcated or fork member 142 connected to the distal end thereof for engagement with one of a series of transversely and equally spaced drive pins 143 affixed to a bar 145 attached to the bottom of base member 88. A block member 146 is interposed between the swivel plates 136 adjacent their free ends and is formed with a guideway 147 therein for receiving the fork member 142 therethrough.

Block member 146 is provided with a laterally projecting extension 148 pivotally secured to a clevis 150 secured to the end of a piston rod 151 attached to a reciprocal piston (not shown) contained in a fluid cylinder 152 connected by means of a bracket 153 to angle member 111. The cylinder 152 is operative to swing the arm or swivel plate assembly and, with the fork member 142 extended into engagement with the drive pin 143, to index or shift the base member 88 and thereby tray 75 a predetermined distance to bring the next succeeding loaded chute 81 into alignment with outlet 112. A stud 155, secured to the lower swivel plate 136 adjacent the end thereof, is engageable with a pair of opposed stops 156 and 157 formed on a bracket 158 rigidly secured to angle member 82 for limiting the extent of arcuate movement of the arm or swivel plate assembly and thereby indexing movement of the tray 75. Suitable control means effect operation of the indexing means in a timed relation to sequentially actuate cylinders 140 and 152 to shift the tray 75 a predetermined distance along tracks 86 and 87.

Figure 8:
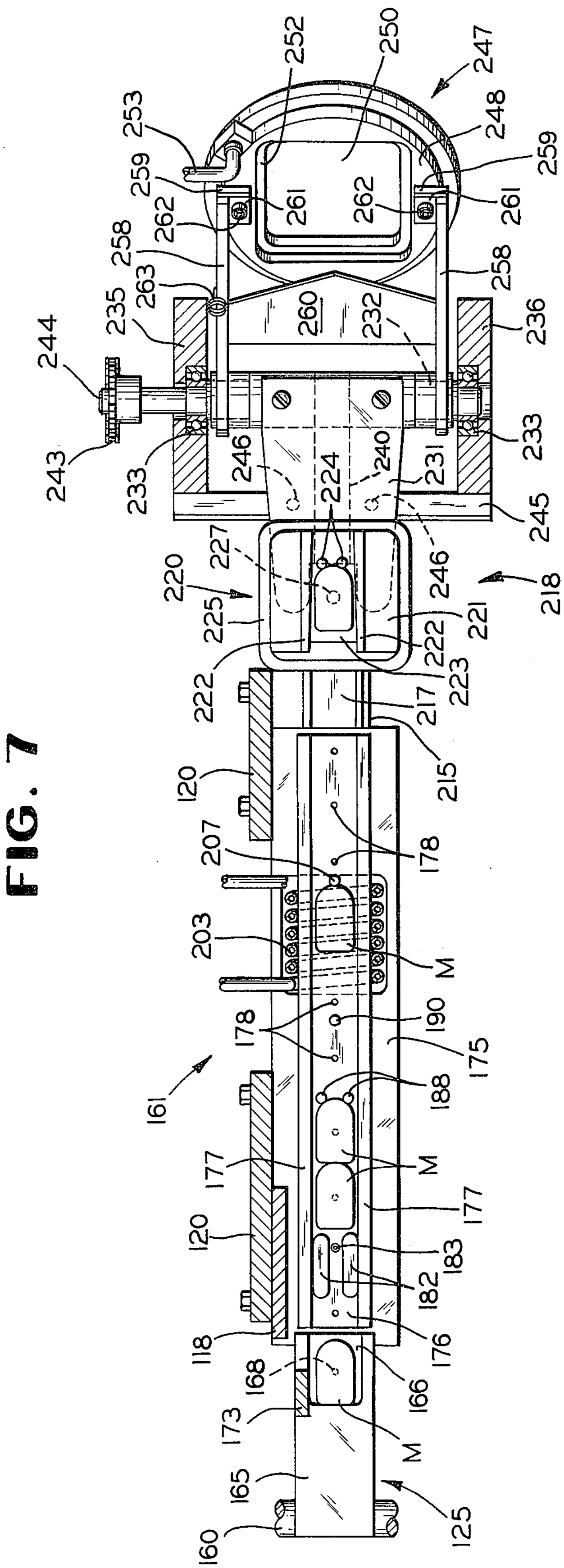
FIG. 8 is a top plan view, partly in section, of the mirror mount conveying and heating arrangement.

The transfer arm 125 is mounted on a rotatable shaft 160 for pivotal movement between an upper mount receiving position shown in FIG. 7 and a lower mount discharging position shown in FIG. 8 for transferring mounts from the block 117 to a slide arrangement, indicated in its entirety by numeral 161. The shaft 160 is journalled in spaced bearings 162 mounted on a cross structural member 163 extending between the columns 68.

The transfer arm 125 comprises a generally flat body 165 having a recess or pocket 166 formed adjacent the free end thereof for receiving and retaining a mount M therein. A conduit 167, connected to a suitable source of air pressure (not shown) communicates with a passage 168 formed inn body 165 and extends into the pocket 166 for delivering air thereto and cause the mount M to float for assisting in the transfer of a mount M from the pocket 166 onto the slide assembly 161.

The means for raising and lowering the transfer arm 125 includes a fluid cylinder 170 secured by means of a bracket 171 to cross member 71 and having a reciprocal piston (not shown) connected to a piston rod 172 attached at its outer end to an upstanding lug 173 formed on the arm 125. A limit switch is mounted on cross member 163 and is provided with an actuator engageable by the body of transfer arm 125 when in its upper position for a purpose hereinafter explained in connection with the operation of the apparatus 20.

Figure 9:
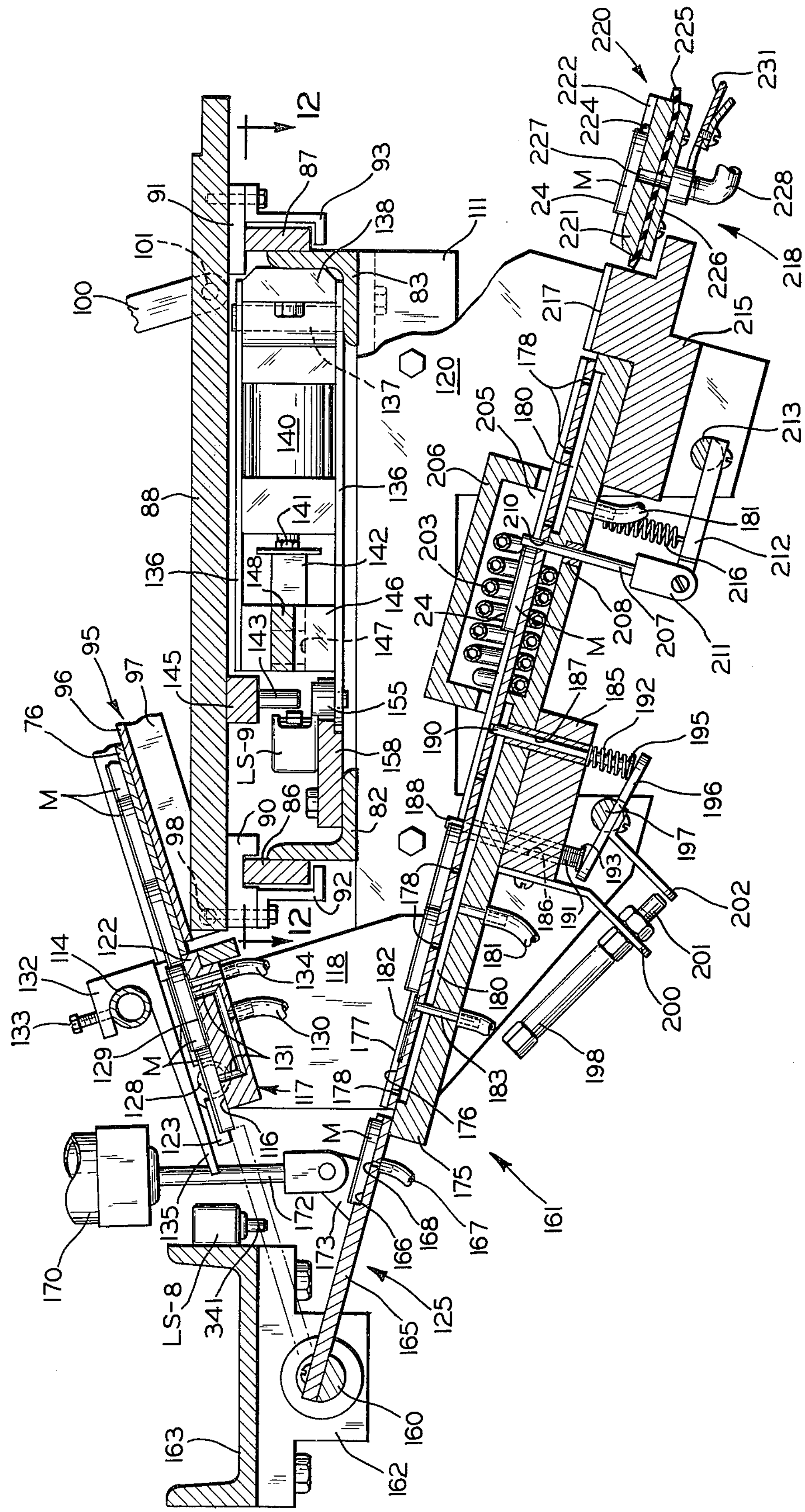
FIG. 9 is a vertical sectional view, showing details of the mirror mount conveying and heating arrangement.

As best shown in FIGS. 8 and 9, the slide assembly 161 comprises an elongated ramp 175 suitably secured at an inclined attitude on support plate 120 and having an inclined upper surface 176 co-planar with the surface of transfer arm pocket 166 when in its lower position. A pair of laterally spaced rails 177 project upwardly from upper surface 176 for retaining and guiding the mirror mounts M sliding downwardly thereon. The ramp 175 has longitudinally spaced inlet passages 178 communicating with a manifold 180 connected to a supply conduit 181 leading to a suitable source of air under pressure (not shown) for supplying air to the upper flat surface 176 of the ramp for floating the mounts M thereon and assisting in the conveyance of the mounts M downwardly along the ramp 175.

A pair of electrical contacts 182 are located on the upper surface 176 of ramp 175 adjacent the upper end thereof for sensing the presence of a mount M thereon for a purpose that will hereinafter be explained. Also, a sensor tube 183, leading to the upper surface of ramp 175, is employed to sense the presence of a mount M, as hereinafter explained, in the event of failure of contacts 182 and their associated circuitry.

Figure 5:
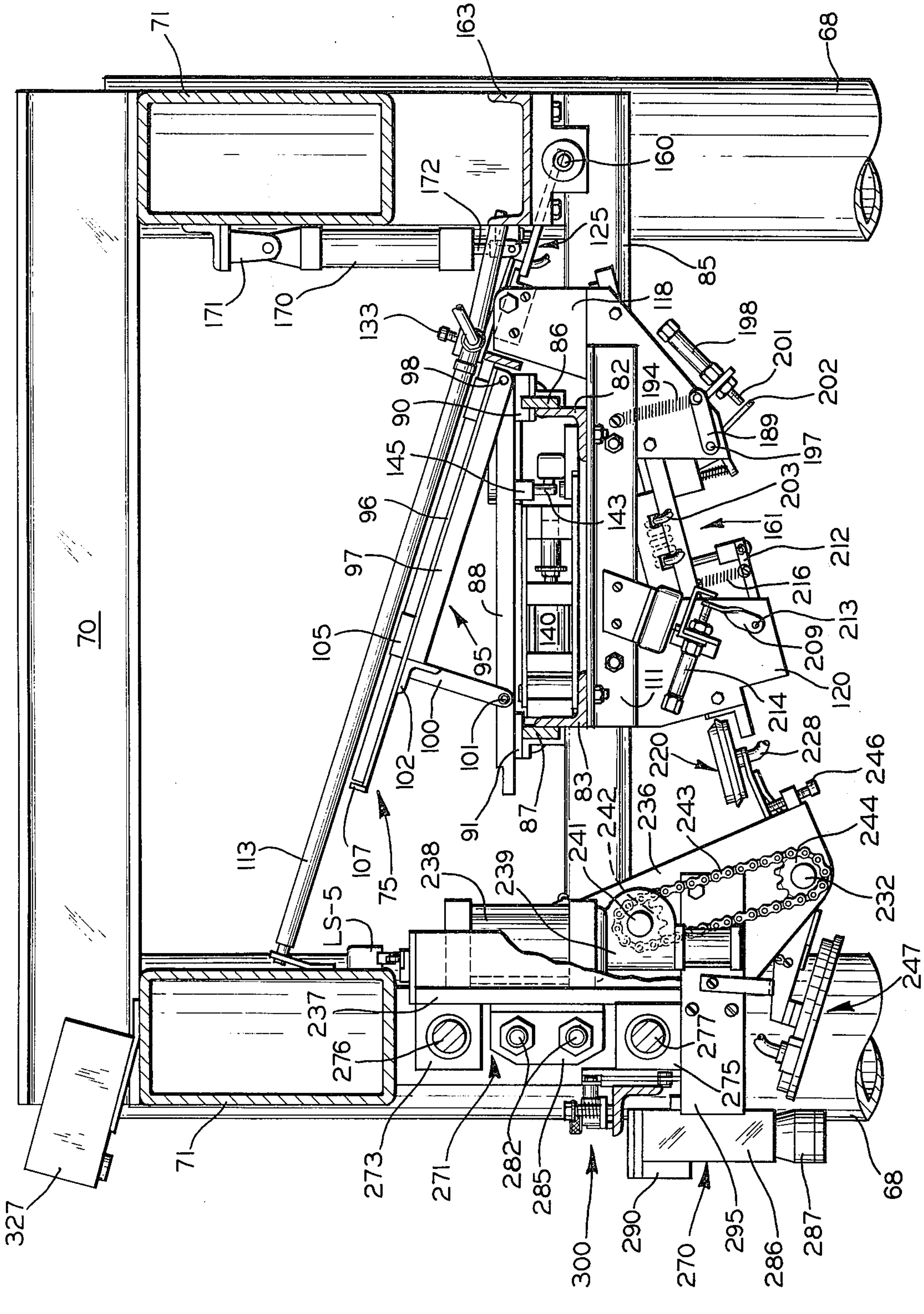
FIG. 5 is a vertical sectional view, on an enlarged scale, taken along line 5—5 of FIG. 1.

Means are provided for retaining the mirror mounts M in a stacked relation on ramp 175 and for feeding the same singly, one at a time, to a heating chamber as will presently be described. To this end, a block 185 is rigidly secured to the bottom side of ramp 175 and is formed with a pair of laterally spaced bores 186 and a bore 187 spaced longitudinally from bores 186 for receiving stop pins 188 and 190, respectively, therethrough, the stop pins being alternatively movable into the path of sliding movement of the mounts M. The pins are biased into their respective retracted positions by helical springs 191 and 192 interposed between the block 185 and the enlarged heads 193 and 195 of pins 188 and 190. A rocker plate 196, rigidly secured to a rotatable shaft 197, is engageable adjacent its opposite ends with the pin heads 193 and 195. As best shown in FIG. 5, one end of an actuating lever 189 is rigidly secured to the shaft 197 and the other end thereof is attached to a helical spring 194 connected to suitable supporting structure. The spring 194 serves to bias the rocker plate 196 in a clockwise direction, as viewed in FIGS. 4 and 9, against the bias of spring 191 to extend pins 188 into the path of movement of the stacked mounts M while allowing the pin 190 to retract under the influence of its spring 192. A cylinder 198, mounted on a bracket 200 affixed to the block 185, is operative to extend its plunger 201 into engagement with an outwardly projecting finger 202 formed on rocker plate 196 and rock the same in a counterclockwise direction against the bias of springs 192 and 194, thereby allowing the pins 188 to retract under the influence of their respective springs 191 and extending pin 190 into the path of movement of the mount released by the pins 188 to interrupt sliding movement thereof along ramp 175.

Thus, the means for feeding mirror mounts M from the tray 75 to the press assembly 218 includes the upper ramp 117 and the lower ramp 175 spaced from an angularly related to the former, the transfer arm 125 for transferring mounts therebetween, and the alternately reciprocal stop pin arrangement for assuring delivery of said mounts one at a time. The reverse downward inclination of the lower ramp 175 relative to upper ramp 117 serves to reorient the mounts M in a reverse direction from that in which they are stacked in tray 75 to assure correct final orientation thereof when applied to the windshield. The reverse angularly related disposition of ramps 117 and 175 also serves to conserve space enabling the entire feeding arrangement to be confined within a relatively small, compact area.

Means are provided on the slide assembly 161 for heating each mount M to the softening temperature of the plastic layer 24 thereof for facilitating the securement of the mount to the inner surface of the windshield. Such means include an electrical induction coil 203 mounted within a heating chamber 205 defined by a housing 206 located intermediate the oposite ends of the ramp 175 downstream of the pin 190. The coil 203 is automatically energized upon the advancement of a windshield toward an operative position, as will hereinafter be explained, and remains energized for a predetermined period of time to impart the necessary heat to mount M temporarily held in chamber 205.

The means for temporarily retaining a single mount M within the heating chamber 205 includes a stop pin 207 extending through a bushing 208 and an aligned opening 210 formed in the ramp 175 and which is adapted to project above surface 176 in heating chamber 205 into the path of movement of the mount M for halting sliding movement thereof. The pin 207 is affixed to a lug 211 pivotally connected to one end of a release arm 212 connected at its other end to a rotatable shaft 213 journalled for rotation in a feed block 215 secured to bracket 120. The pin 207 is normally biased into an extended position above surface 176 by means of a spring 216 attached at its opposite ends to the arm 212 and ramp 175. The other end of shaft 213 is connected to an actuating lever 209 (FIG. 5) adapted to be engaged and pivoted by the plunger of a fluid actuator 214 mounted on the bracket 120. The actuator 214 is operative to retract pin 207 against the bias of spring 216 and release the heated mount M for continued advancement along the ramp surface 176 and onto the channelled upper surface 217 of feed block 215 for ultimate delivery to a movable press assembly, generally designated 218, as will presently be described.

Figure 10:
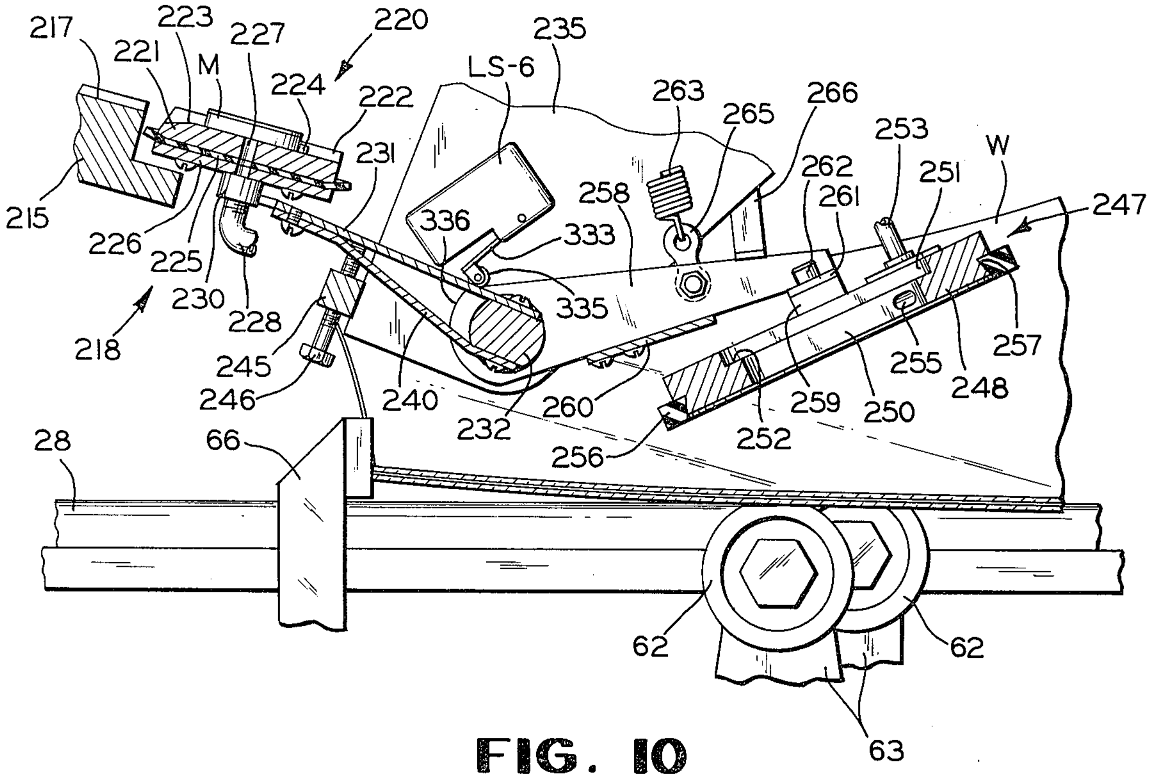
FIG. 10 is a vertical sectional view, partly in elevation, showing the mirror mount press arm and seal ring in a mirror mount receiving position.
Figure 11:
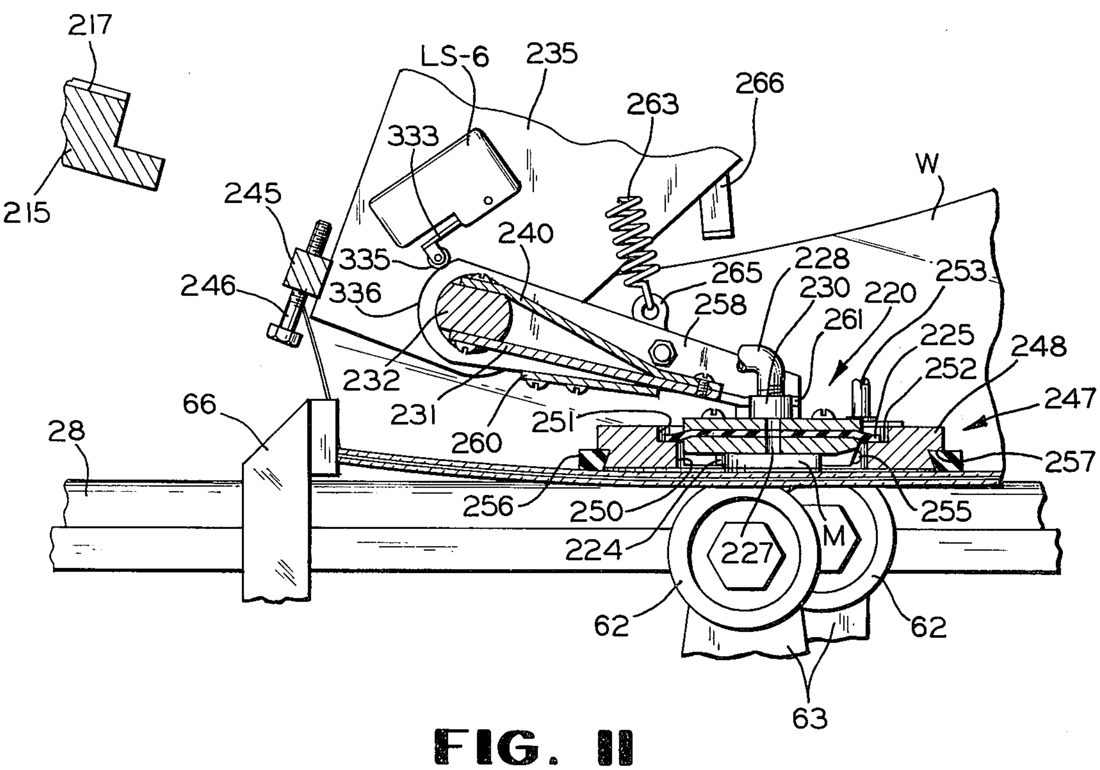
FIG. 11 is a view similar to FIG. 10, showing the press arm and seal ring in the mirror mount applying position.
Figure 12:
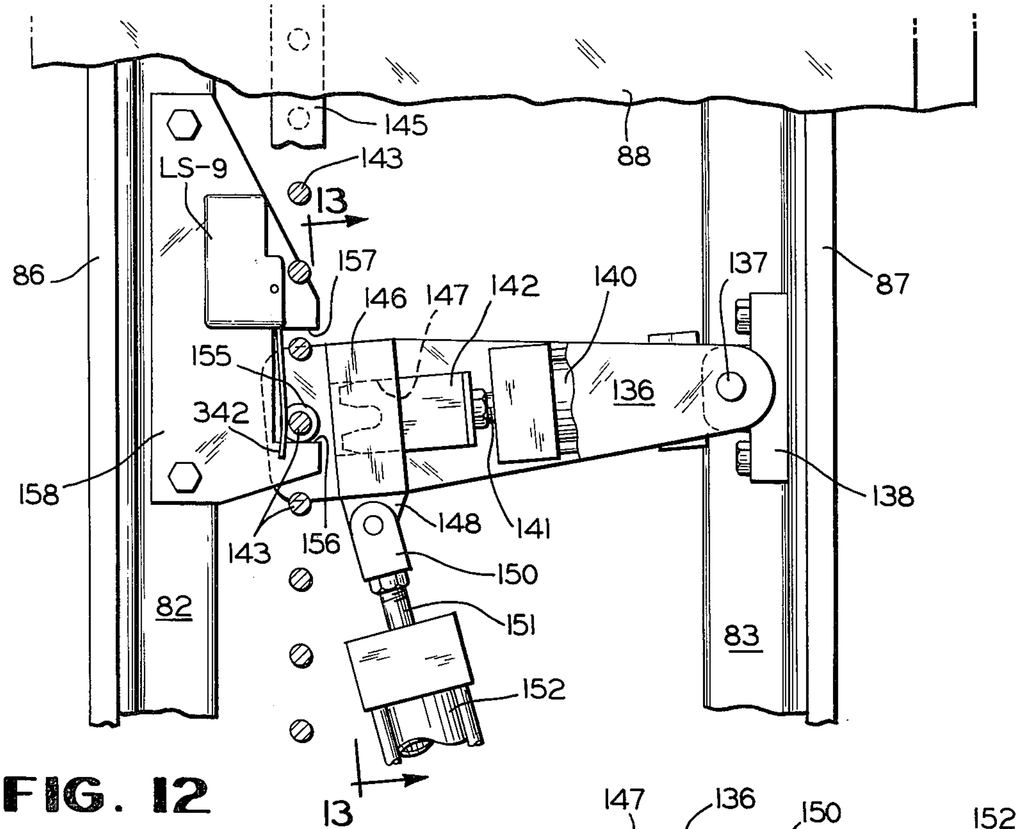
FIG. 12 is a horizontal sectional view, taken along line 12—12 of FIG. 9.
Figure 13:
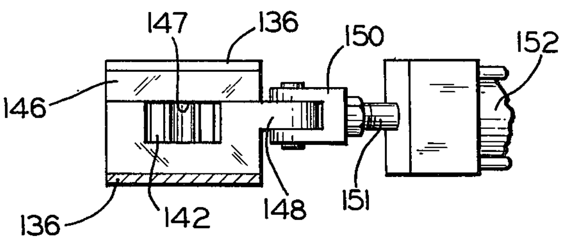
FIG. 13 is a fragmentary vertical sectional view, taken along line 13—13 of FIG. 12.

Referring now particularly to FIGS. 8, 10, and 11, the press assembly 218 comprises a mount holding socket member 220 adapted to receive a heated mirror mount M and deliver the same to the inboard surface of the windshield W. The socket member 220 includes a body 221 of generally square configuration in plan (FIG. 8) having an upper central surface formed on the front face thereof and interposed between laterally spaced guide rails 222 to define a mount supporting channel 223. When in its mount receiving position, the channel 223 is aligned with the upper surface 217 of feed block 215 to receive a mount therefrom and is provided with a pair of upwardly projecting stop pins 224 to retain the mount M therein. A flat seal 225 having marginal edges protruding beyond the marginal edges of body 221 is sandwiched between the rear face thereof and a backing plate 226 secured to the body 221. A passage 227, connected to a vacuum line 228 by means of a coupling 230, extends through the backing plate 226, seal 225, and body 221 into the channel 223 for the application of a suction force holding a mirror mount in place within the channel 223 when the socket member 220 is swung from the position shown in FIG. 10 to that depicted in FIG. 11.

The socket member 220 is mounted on the bifurcated end of a press arm member 231 rigidly secured by suitable fasteners at its other end to a rotatable shaft 232 journalled for rotation in spaced bearings 233 mounted in side support plates 235 and 236, in turn connected to an upright main plate 237 (FIG. 5) forming a part of the traversing carriage, hereinafter more fully described. A brace member 240 also is secured at its one end to shaft 232 and at its other end to the press arm 231 to reinforce and offer support therefor.

The means for actuating shaft 232 includes a motor 238 mounted on the above mentioned carriage main plate 237 for rotating, through a suitable gear reduction mechanism 239, an output shaft 241 having a drive pinion 242 thereon. An endless drive chain 243 is entrained about drive pinion 242 and a pinion 244 mounted onn an outwardly projecting extension of the shaft 232. A transversely extending stop bar 245 is secured at its opposite ends to the rear edges of side plates 235 and 236 and is provided with tapped openings for receiving stop screws 246 engageable with the press arm 231 for limiting counterclockwise movement thereof and properly positioning the same to align the channel 223 with the upper surface 217 of feed block 215 when socket 220 is in its upper mount receiving position.

A seal ring 247 is used in conjunction with the pivotal socket member 220 to effect application of the mount M to the windshield W. The seal ring 247 comprises a body 248 of generally circular shape in plan having a square shaped opening 250 centrally therein (FIG. 8) for receiving the socket member 220. Opening 250 is enlarged, as shown at 251 in FIGS. 10 and 11, to define a seat 252 for the seal 225 of socket member 220. A vacuum line 253, connected to a suitable source of vacuum (not shown), communicates with a passage 255 formed in body 248 and which extends to the interior of seal ring 247 to provide a suction force therein. An annular, resiliently yieldable seal member 256 is rigidly secured in a complementary groove 257 formed at the juncture of the interface and peripheral wall of seal ring 247 and is engageable with the inboard surface of windshield W to form a fluid tight seal therebetween.

The means for supporting seal ring 247 comprises a pair of laterally spaced arms 258 mounted at their one ends on shaft 232 for pivotal movement relative thereto and connected together by a flexible torque arm 260 extending therebetween. The arms 258 are provided at their other ends with inturned lugs 261 having resiliently yieldable rubber or elastomeric grommets 259 secured to the rear face of seal ring 247 by suitable fasteners 262 extending through the lugs 261. The resiliently yieldable grommets 259, together with the flexibility of torque arm 260, enables portions of the seal ring 247 to be displaced relative to each other upon engagement thereof with the windshield to conform to the curvature or surface contour of the windshield. A return spring 263, secured at its upper end to side plate 235 is attached to one of the arms 258 by a lug 265 for biasing the seal ring 247 into its upper position against the stop 266, as shown in FIG. 10. The seal ring 247 is swung into its lower position against the bias of spring 263 by the engagement thereagainst of socket member 220 in its arcuate movement toward the windshield W.

The accurate placement of the mirror mount M on the inner surface of a windshield in an automatic, continuous production run presents problems because of the variance in the longitudinal dimensions, outlines, and cross sectional shapes of the windshields. Also, since they are normally placed on the conveyor belts by hand, even identically shaped and dimensioned windshields will not be uniformly oriented on the conveyor, i.e., the location of the transverse axis of the windshield relative to the longitudinal axis of the conveyor and thereby the inboard elevator 32 may vary from windshield to windshield.

In accordance with the present invention, the mirror mount applying apparatus 20 is operative to position and affix a mirror mount M in place on the inner surface of the windshield in a precise orientation centrally of the windshield using the closely spaced, centrally located vertical leg portions 21 of the antenna wires A embedded therein as reference lines. To this end, means are provided for seeking or detecting such vertical leg portions 21 which are accurately laid parallel to the transverse axis of the windshield at opposite sides thereof and at equally spaced distances therefrom and from the opposite transverse edges of the windshield. In the absence of antenna wires, the windshields can be provided with suitable temporary reference indicia, such as a removable line extending along the transverse axis of the windshield for example.

Figure 14:
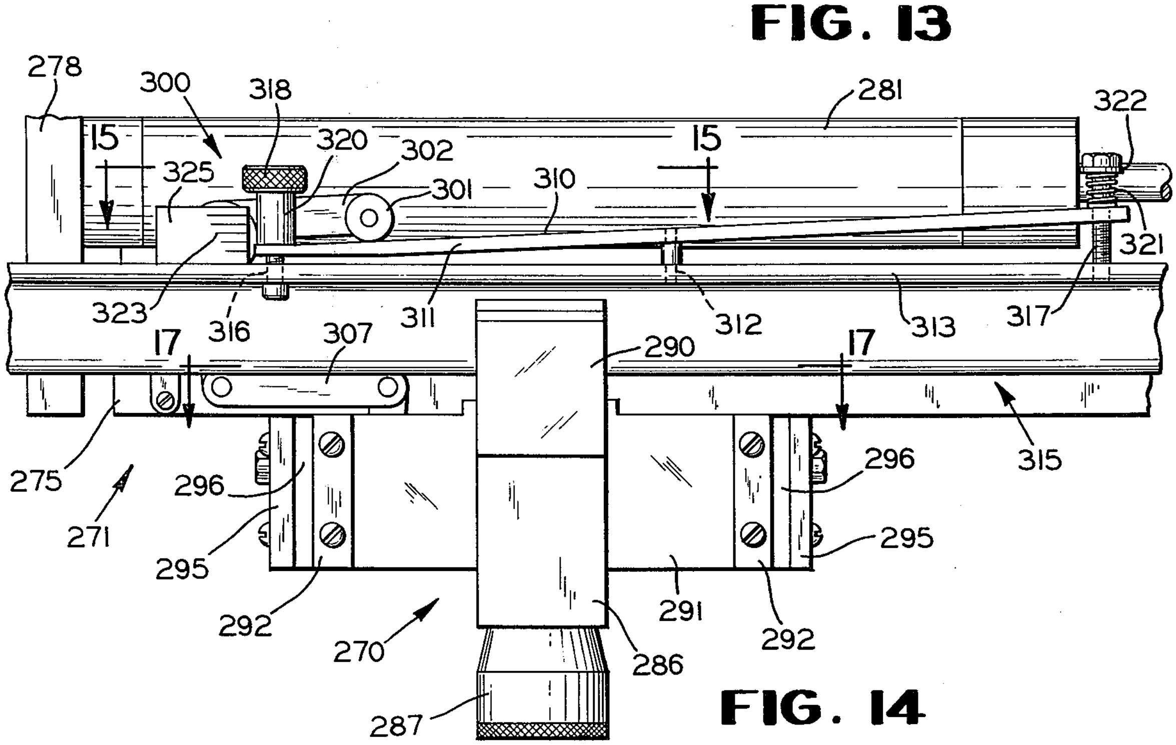
FIG. 14 is a fragmentary front elevational view, looking in the direction of arrows 14—14 in FIG. 4, showing the scanning device and the means for guiding the same along a path of travel.
Figure 15:
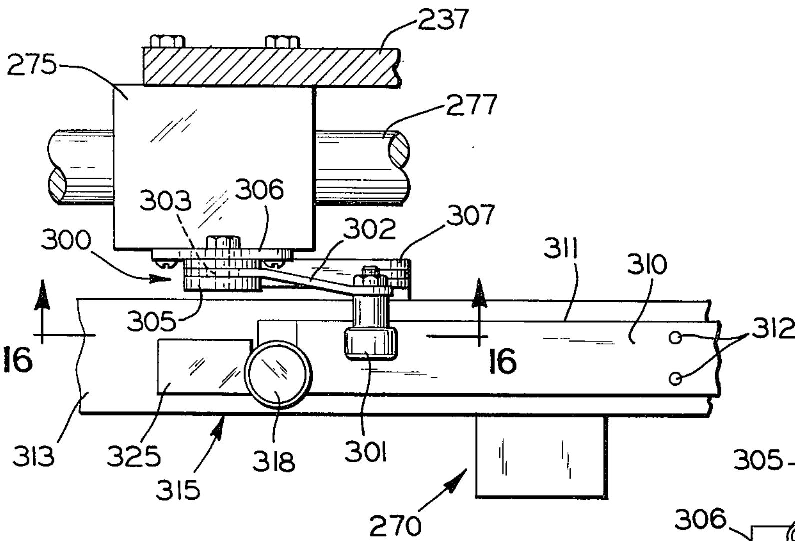
FIG. 15 is a horizontal sectional view, taken along the line 15—15 of FIG. 14.
Figure 16:
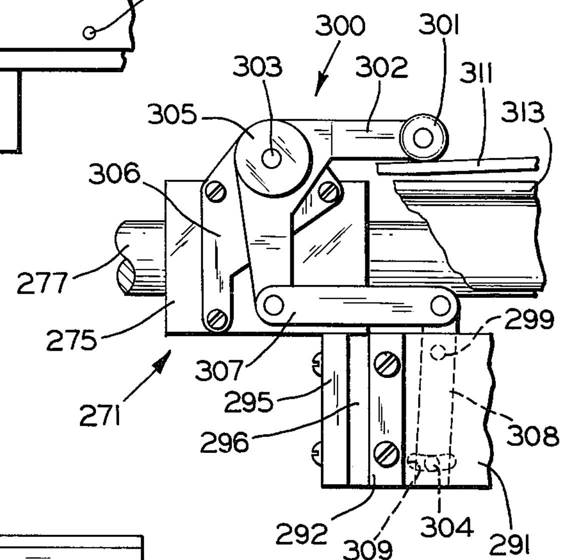
FIG. 16 is an enlarged fragmentary view, looking in the direction of arrows 16—16 in FIG. 15, showing the mechanical arrangement for imparting movement to the scanning device.
Figure 17:
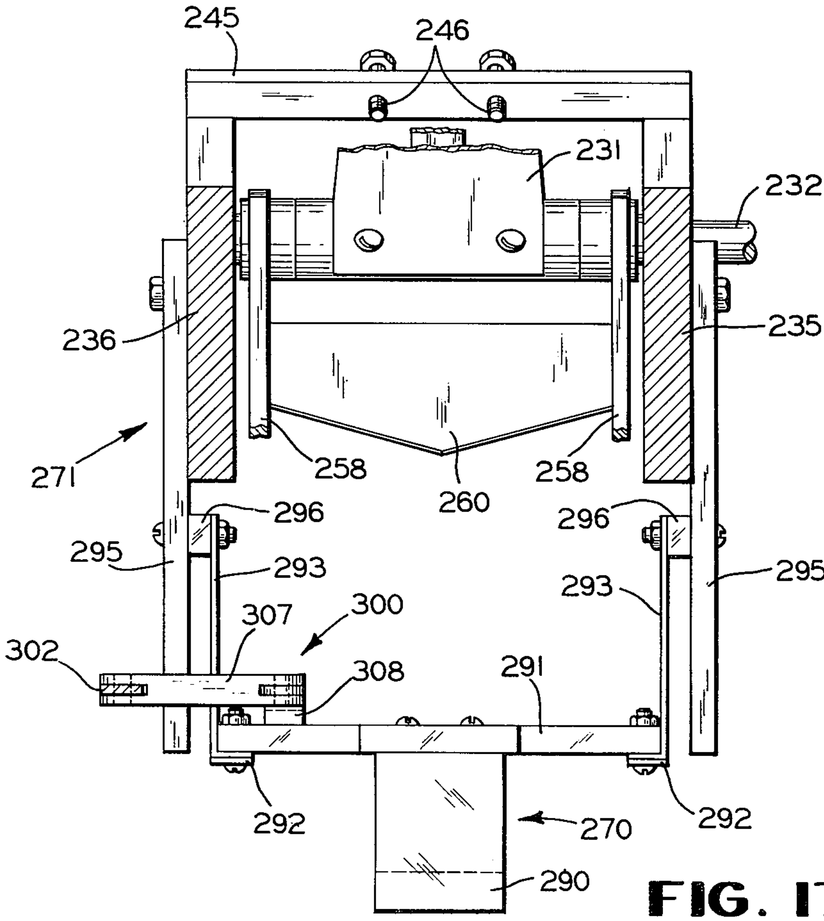
FIG. 17 is a horizontal sectional view, taken along the line 17—17 of FIG. 14.

As best shown in FIGS. 3, 5, and 14, such antenna wire detecting means comprises a tubular scanning device 270 mounted on a traversing carriage 271 by connecting means, hereinafter described in detail. The carriage 271 comprises the hereinbefore mentioned upright main plate 237 having an upper bearing block 273 and a pair of lower, laterally spaced bearing blocks 275 (FIGS. 3 and 5) secured thereto for receiving and sliding on vertically spaced runners or shafts 276 and 277 extending transversely of apparatus 20 and mounted at their opposite ends in plates 278 forming a part of the support frame 280 suspended from the main frame. The means of reciprocating the carriage 271 comprises a pair of fluid cylinders 281 mounted at their head ends on one of the end plates 278 and having reciprocal pistons connected to piston rods 282 secured, as by nuts 283, to a bracket 285 affixed to the carriage main plate 237.

The scanning device 270 comprises a tubular body 286 having a suitable lens assembly 287 at the lower distal end thereof and suitable prisms and photoelectric cells (not shown) adjacent the upper end thereof for receiving the light rays emitted from a light source in the form of an elongated lamp 288 (FIG. 2) vertically aligned with the scanning device 270 and extending transversely across and beneath the part of movement of the windshield W. The lamp 288 is housed in a transversely extending tray 289 secured at its opposite end to the beams 45 of the inboard elevator 32. An inverter L-shaped connector member 290 is secured to the upper end of body 286 for connecting the photocells to a suitable electric control circuitry containing the usual amplifier, signal receiving and signal responsive means well known in the art.

As shown in FIGS. 14 through 17, the scanning device 270 is mounted in a vertical attitude on a support plate 291 connected at its opposite ends to the inturned flanges 292 of a pair of flex plates 293. The latter are secured at their inner ends to a pair of side plate brackets 295 and maintained in spaced relations thereto by spacers 296. The flex plates 293 permit slight rectilinear movement of the scanning device 270 relative to the carriage 271 in the direction of carriage travel for a purpose that will presently be described.

The scanning device 270, carried by carriage 271, is adapted to traverse the windshield W when properly located against the stops 66 on inboard elevator 32 for seeking and detecting the first of the pair of antenna wire leg portions 21 to produce a signal effecting stoppage of the carriage 271 and subsequent accurate placement of a heated mirror mount M on windshield W. Referring now to the schematic illustration of FIG. 19 wherein a windshield W is positioned against the stops 66 on inboard elevator 32, the scanning device 270 moves in a linear path transversely across the windshield as indicated by the line Y—Y. The orientation of the socket member 220 on carriage 271 relative to the scanning device 270 is so designed that upon termination of movement of carriage 271, socket member 220 is accurately aligned with the transverse axis of the windshield to place, upon subsequent actuation thereof, a mirror mount M in the region designated Z between the antenna wire leg portions 21 in spaced relation to the scanning device's path of travel Y—Y. In the illustrated embodiment depicted in FIG. 19, the leg portions 21, which are parallel to the center line or transverse axis X—X of the windshield, also are parallel to the center line or longitudinal axis X'—X' of the inboard elevator 32, the axes X—X and X'—X' being coincident.

Figure 19:
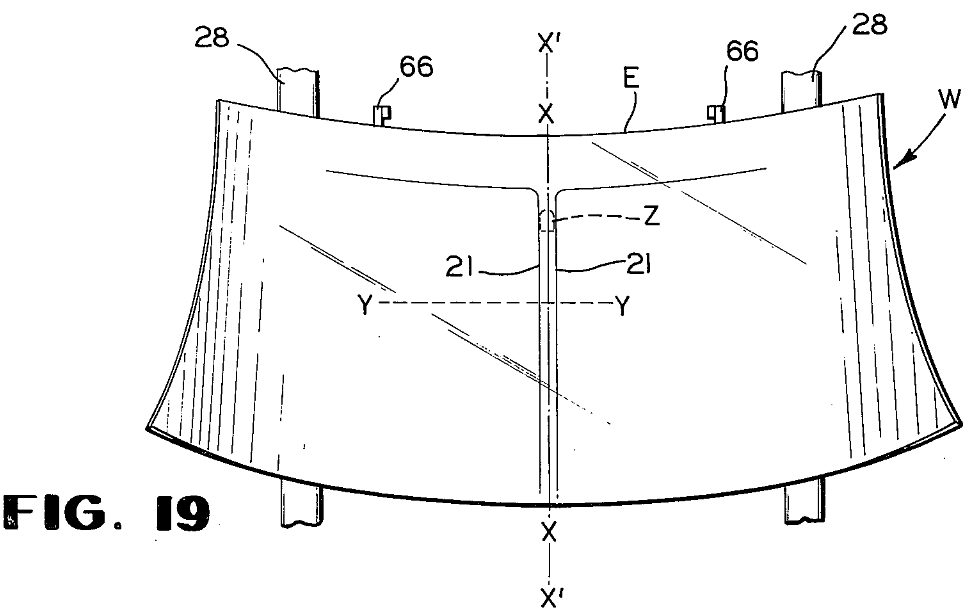
FIG. 19 is a schematic top plan view, showing a windshield positioned against the stops of the inboard elevator with the axes of the windshield and elevator, respectively, being coincident.
Figure 20:
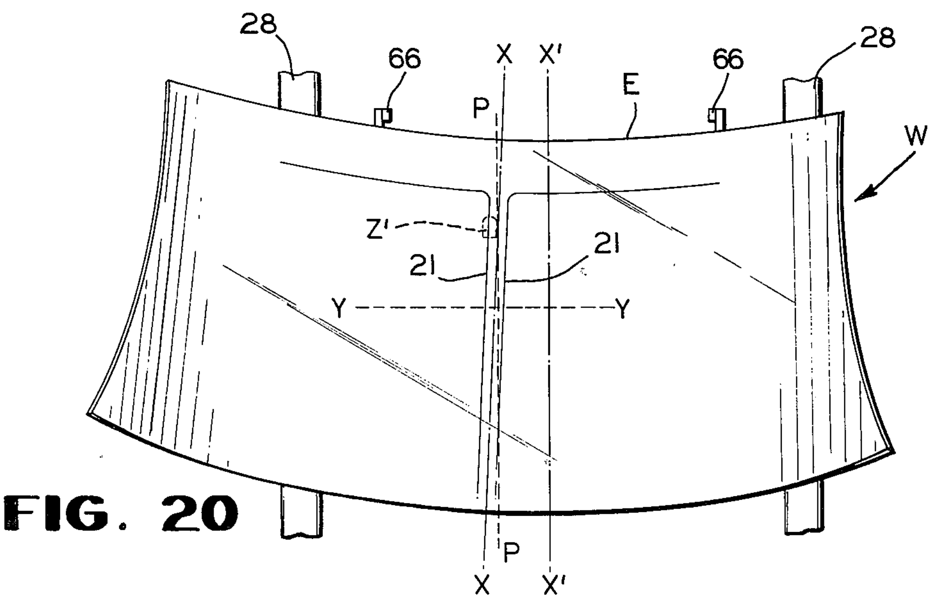
FIG. 20 is a view similar to FIG. 19, showing the axis of the windshield laterally offset from the axis of the elevator.

As hereinbefore mentioned, however, since the windshields are manually placed on the conveyor belts 28, the transverse axis X—X of each windshield entering apparatus 20 usually will be laterally offset from the axis X'—X' of inboard elevator 32 and, because the leading edge E of the windshield is of a generally arcuate or curved configuration, this offset orientation causes the antenna wire leg portions 21 to extend in a direction outwardly at an angle away from a vertical plane P—P parallel to the true longitudinal axis X'—X' as shown in FIG. 20 rather than parallel thereto as would otherwise occur if the windshield had a straight leading edge perpendicular to axis X'—X' or if the axis X—X of a concave windshield having a curved leading edge coincided with axis X'—X', such as shown in FIG. 19. It can be appreciated that if the relative orientation of the scanning device 270 and socket member 220 remain fixed, stoppage of the carriage 271, as determined by the detection of the first leg portion 21, would locate the socket member 220 in a position misaligned from the transverse axis X—X of windshield W, i.e., to the left thereof as viewed in FIG. 20, to cause the mirror mount to be inaccurately placed in the area designated Z' in FIG. 20.

In order to avoid such misalignment, means are provided for shifting or moving the scanning device 270 rectilinearly in the direction of carriage travel relative to the carriage and thereby socket member 220 to compensate for the angular variance of the antenna wire leg portions 21 from a true longitudinal plane due to the curvature of the leading edge of windshield W and its off center disposition relative to apparatus 20.

The means for effecting such relative axial movement between scanning device 270 and carriage 271 during traversing movement of the latter includes a cam operated linkage assembly, generally designated 300 (FIGS. 14–17), comprising a cam follower in the form of a roller 301 provided on one end of a bell crank lever 302 mounted on a pivot pin 303 journalled at its opposite ends in a bearing 305 and a mounting plate 306 secured to the front face of one of the bearing blocks 275. The other end of the bell crank lever 302 is pivotally connected to one end of a horizontally extending link 307 pivotably connected at its other end to a vertically extending adjusting lever 308, in turn rigidly secured at spaced points by a pin 299 and a clamping screw 304 (FIG. 16) to the rear face of support plate 291. The clamping screw 304 can be loosened and slid in an arcuate slot 309 formed in support plate 291 to provide for minor adjustments, if necessary. Thus, pivotal movement of the bell crank lever 302 effects, through link 307 and adjusting lever 308, shifting movement of the support plate 291 and thereby scanning device 270 to the left or right, as viewed in FIG. 14, relative to the carriage 271.

Pivotal movement of the bell crank lever 302 is effected by the rolling engagement of cam follower 301 on the upper surface 310 of an elongated guide cam 311 during traversing movement of the carriage 271. The follower 301 is wedged against the cam surface 310 under the influence of the bias of flex plates 293, which tend to bias the support plate 291 and thereby scanning device 270 leftwardly, as viewed in FIG. 16, relative to the carriage 271. The guide cam 311 extends in the direction of carriage traverse and is supported substantially centrally thereof on a pair of fulcrum pins 312 projecting upwardly from the horizontal leg 313 of a transversely extending angle member 315 forming a part of the support frame 280. The cam guide 311 is supported adjacent its opposite ends on a threaded stud 316 projecting upwardly from angle member leg 313 and a screw 317 threaded downwardly into a tapped opening formed in the leg 313, the stud and screw being insertable through suitable openings formed in the guide cam 311. The rise of the cam surface 310 is determined by the curvature of the leading edge of the windshield being assembled to progressively advance the scanning device 270 relative to the socket member 220 during carriage traverse to bring the socket member 220 into accurate alignment with the transverse axis X—X of the windshield upon stoppage of carriage 271.

Means are provided for selectively adjusting the rise of cam surface 310 and thereby the degree of relative shifting movement of the scanning device 270, as dictated by the leading edge curvature of the workpiece, by tilting the guide cam 311 about fulcrum pins 312. To this end, a rotatable knob 318 is provided with a shank portion 320 threaded on the stud 316 in bearing engagement against the upper flat surface of one end of guide cam 311. At the other end, a helical spring 321 is disposed about the screw 317 and interposed between the upper surface of cam guide 311 and an abutment washer 322. Manipulation of the knob 318 effects tilting of the cam guide 311, as desired, to alter the rise of cam surface 310. A suitable marker or pointer can be provided on the peripheral surface of shank 320 and referenced to a scale 323 inscribed on a block 325 mounted on leg 313 to provide a visual indication of the adjustment desired.

As shown in FIGS. 1 and 2, a pair of photoelectric controls 326 and 327 are mounted in a side-by-side relation on the forward upper cross member 71 for emitting light beams L and LL, respectively, from suitable light sources therein to longitudinally spaced reflective targets 328 and 329 (FIG. 1) mounted on suitable cross members extending transversely across the frame 22. The light beams L and LL are reflected from targets 328 and 329 on the same axis emitted and received onto suitable photocells in the photoelectric controls 326 and 327, respectively. The light beams L and LL are interrupted by windshields advancing into stations above the outboard and inboard elevators 31 and 32, respectively, for producing signals controlling, by means of suitable electrical circuitry and a solenoid-operated fluid control valve, operation of the elevator actuator 47 and other electrically controlled components.

Since the various control circuits, timing mechanisms, and solenoid-operated fluid control valves, hereinafter mentioned, for effecting operation of the several actuators can be conventional, they have not been illustrated nor described in detail herein and it is believed that no further amplification thereof is necessary except for limit switches LS-1 through LS-10, the actuation of which will be described in connection with the mode of operation described below.

In operation, windshields W are supported and advanced one at a time, in a generally horizontal path on conveyor belts 28 in the direction of arrow A shown in FIG. 1. The windshields W are placed on the belts 28 in a manner disposing their longitudinal axes in a direction transverse to the path of movement with the inboard sheet I facing upwardly. The leading edge of the windshield W is that edge nearest which the horizontal leg portions of the antenna wires A are located.

As a windshield W reaches a position adjacent the outboard elevator 31, it interrupts the beam of light L to produce a signal initiating, through a suitable electrical control circuit, a heating cycle for energizing the induction coil 203 to heat a mirror mount M located in chamber 205.

Assuming there is no preceding windshield positioned on the inboard elevator 32 downstream of the entering windshield, limit switch LS-1, mounted on the inboard elevator 32, will remain open precluding operation of the outboard elevator 31. Accordingly, the entering windshield continues to advance on the belts 28, interrupting the second light beam LL to produce a signal for actuating cylinder 47 to raise the inboard elevator 32 and lift the windshield from belts 28. The windshield, while being lifted by elevator 32, continues to advance in a horizontal path by means of the drive rolls 48 until the leading edge thereof engages stops 66, which will be disposed above the level of conveyor belts 28 by the time the windshield approaches the same. Thus, the leading edge of the windshield is properly located relative to the mount applying apparatus and the windshield continues to rise until cylinder 47 reaches the end of its upstroke.

The electric circuitry controlling energization of induction heating coil 203 includes a timing mechanism operative for a predetermined period of time to assure proper heating of the mirror mount M in chamber 205. When this mechanism times out, it actuates, through a suitable solenoid-operated fluid control valve, cylinder 214 (FIG. 5) to extend its plunger against lever 209 and pivot the same. This effects rotation of shaft 213 to retract stop pin 207 out of abutting relation with the heated mount M and release the latter for sliding movement, assisted by air flotation, downwardly along the ramp surface 176 and block channelled surface 217 into the channel 223 of socket member 220 against stop pins 224. Simultaneously, cylinder 198 is activated along with cylinder 214 to swing the rocker plate 196 in a counterclockwise direction, retracting pins 188 and extending pin 190 to enable the leading cold mount M on ramp surface 176 to advance against the pin 190. The valve controlling actuation of cylinders 214 and 198 is operative for a short period of time, say 0.6 seconds for example, after which the plungers of cylinders 198 and 214 are retracted to effect extension of the pins 188 and 207 into their respective extended positions shown in FIG. 9 under the influence of springs 194 and 216. Return movement of plate 196 in a clockwise direction (FIG. 9) effects retraction of the spring loaded pin 190 to release the leading cold mount M for movement into chamber 205 against stop pin 207 in readiness for the next heating cycle while the next succeeding cold mount M is halted by the extended pins 188.

When the inboard elevator 32 reaches the end of its upstroke, an extension 331 (FIG. 3) secured to one of the elevator beams 45 engages an actuating lever 332 of a limit switch LS-2, energizing an electrical circuit controlling operation of cylinders 281 to traverse the carriage 271 across the windshield W, or to the right as viewed in FIG. 3. As the carriage begins its traversing movement, the bearing 273 mounted on carriage 271 is disengaged from the actuating lever 279 of a limit switch LS-3 to energize the photocells of the scanning device 270. Also the actuation of limit switch LS-2 energizes an electrical circuit controlling the establishment of a vacuum in line 228 (FIGS. 10 and 11) to hold the heated mount M in socket member 220.

As the carriage 271 and thereby the scanning device 270 traverses the windshield in seeking the antenna wire vertical leg portions 21, the scanning device 270, via the cam operated linkage assembly 300 and the flex plate arrangement 293, moves forwardly (rightwardly as viewed in FIG. 14) relative to carriage 271, causing the scanning device 270 to move at a faster rate than the former to assure accurate positioning of the socket member 220 relative to the antenna wire leg portions 21 upon stoppage of carriage 271. As the scanning device 270 intersects the first antenna wire vertical leg portion 21, the difference in the intensity of the light beam passing therethrough and received on the photocell mounted in the scanning device 270 produces a signal which, through a suitable electrical control circuit and a solenoid-operated fluid control valve, terminates operation of the cylinders 281 to halt transverse movement of the carriage 271. This positions the mount transfer apparatus 218 and socket member 220 in the proper location for the mount applying operation. The signal produced by the scanning device photocells also, through a separate control circuit and solenoid-operated fluid control valve, activates the motor 238 to effect rotation of the press arm 231 to swing the socket member 220 from its upper position shown in FIG. 10 to the mount applying position shown in FIG. 11. As the socket member 220 swings in its arcuate path in a clockwise direction, as viewed in FIG. 10, the seal 225 thereof seats against shoulder 252 of seal ring 247 and carries the same therewith into engagement with the inner surface of windshield W.

A limit switch LS-6 (FIGS. 10 and 11), mounted on the support plate 235, is provided with an actuating lever 333 having a cam follower 335 adapted to ride on a cam surface 336 formed on the end of the ring member supporting arm 258. Pivotal movement of the seal ring supporting arm 258 downwardly against the bias of spring 263 during final travel of the press arm 231 angularly displaces the cam surface 336 to lift the follower 335 riding thereon and, through lever 333, actuates limit switch LS-6. The closing of limit switch LS-6 energizes a suitable control circuit to interrupt the vacuum force applied through line 228 behind the mirror mount and establish a vacuum force through line 253 and passage 255 into the interior of seal ring 247 to withdraw any air trapped between the mirror mount M and the inner surface of windshield W, which trapped air would tend to abort the attainment of a strong bond therebetween. This vacuum force also assists the force applied by arm 231 to press the mirror mount M against windshield W and effect a bond between the interfaces of the heated plastic layer 24 of mount M and the windshield W. The engagement of seal member 256 with the windshield surface effects a fluid tight seal therebetween, precluding leakage of ambient air into the interior of seal ring 247.

The arm 231 remains in its lower pressing position for a predetermined time, as dictated by a suitable timer incorporated in its associated control circuitry, to effect the bond between the mirror mount M and windshield W. After such aforementioned predetermined time, the vacuum to line 253 is interrupted and actuators 238 and 47 become operative to rotate the press arm 231 in a reverse direction returning the socket member 220 to its upper mount receiving position and lower the inboard elevator 32, respectively. The seal ring supporting arm 258 is then free to return to its initial, suspended position under the influence of spring 263. At this time, the photocells in the scanning device 270 also are de-energized.

As the inboard elevator 32 descends, the extension 331 is disengaged from the spring loaded actuating lever 332 to open limit switch LS-2 and de-energize the circuit controlling operation of cylinders 281 for retracting their associated piston rods 282 to return the carriage 271 to its initial starting position.

In the event a windshield does not contain antenna wires due to inadvertence or error in the assembly thereof or if the windshield is received and located on the inboard elevator in a manner positioning the antenna wires beyond the range of travel of the scanning device 270, the carriage 271 will completely traverse the apparatus and a switch actuator 337 (FIG. 3) attached thereto will engage the lever 338 of a limit switch LS-5, energizing a timing mechanism and completing a circuit to control the flow of air through a discharge nozzle 340 to eject the heated mount M located in socket member 220. When this mechanism times out, the inboard elevator 32 is lowered and opens limit switch LS-2 for returning the carriage to its starting position. The elevator continues to descend below the conveyor belts 28 and deposits the incomplete windshield thereon for conveyance out of the apparatus 20.

The mode of operation of the mirror mount applying apparatus 20 was described above in connection with the conveyance of a single windshield through the apparatus 20. However, it should be understood that the assembled windshields are fed one at a time at spaced intervals on conveyor belts 28. Accordingly, after the leading windshield advances into position above the inboard elevator 32 and is raised thereby for the mount applying operation, the leading edge of the second advancing windshield will be raised upwardly off the conveyor belts 28 by means of the rear rollers 62 on inboard elevator 32. This second advancing windshield also engages the actuating lever 330 of limit switch LS-1, now located in the path of movement thereof, to initiate operation of the outboard elevator 31 and raise the latter to lift the rear portion and thereby the entire second windshield off conveyor belts 28. Also the advancing second windshield interrupts the light beam L to initiate the heating of a fresh mount in the manner hereinbefore described. The leading edge of such second windshield engages and is halted by the stops 65, which also are mounted on the inboard elevator 32 and have been elevated into the path of movement of the second windshield. This arrangement checks advancement of the second windshield until the first has completed its cycle.

During the descent of the inboard elevator 32 after the mount applying operation, limit switch LS-1 is opened to effect lowering of and the release of the second windshield W from the outboard elevator 31 onto the conveyor belts 28 for advancement above the inboard elevator 32 and a repeat of the above described cycle. Should a third windshield approach the outboard elevator 31 while both elevators 31 and 32 are occupied, it will trip a limit switch LS-7 which, through an interlock in the electrical control circuitry, will stop conveyor belts 28 to terminate further advancement of the third windshield to avoid jamming thereof in apparatus 20. Simultaneously the inboard elevator 32 willl be lowered to release the leading windshield onto conveyor belts 28 and permit the next succeeding windshield to advance into position on the inboard elevator for cycling. Thereupon, the interlock becomes disabled to reactivate the system for repeated continuous cycling.

Referring now to the mount feeding operation, best shown in FIG. 9, mounts M are fed one at a time to the heating chamber 205, from where they are subsequently conveyed onto the socket member 220. When the upper end of ramp surface 176 is devoid of mounts, a circuit including electrical contacts 182 is energized to produce a signal initiating activation of a repeat cycle timer included in the transfer arm control circuitry. Should contacts 182 fail, the absence of mounts M on the upper end of ramp surface 176 will be sensed by the decrease in back pressure in sensor tube 183 to produce the same signal.

The repeat cycle timer is alternately energized and de-energized, i.e., on and off, for equal periods of time. When on, it is effective to simultaneously lower the transfer arm 125 with a mount M seated in pocket 166 and operate cylinder 126 to extend stop member 128 into clamping engagement against the next leading mount M located on the upper surface 116 of block 117 and prevent the same from sliding off the open end thereof. The arm 125 swings into its lower position to discharge, via gravity and air flotation, the mount M onto ramp surface 176. On the off cycle of the timer, the arm 125 is raised to receive a fresh mount. As arm 125 approaches the end of its upward travel, it engages the plunger 341 of a limit switch LS-8 to actuate cylinder 126 and retract stop member 128, releasing the leading mount M for delivery into the pocket 166 of transfer arm 125. This cycle is repeated until the mounts stack up on the ramp surface 176 in seating engagement on contacts 182 in a position also covering the outlet of sensor tube 183 to de-energize the repeat cycle timer.

When the particular chute 81 feeding the mounts to transfer arm 125 becomes empty, as sensed by the absence of a mount on electrical contacts 129, or the reduction of back pressure in sensor tube 134 in the event of failure of contacts 129, a signal is produced to operate cylinder 140 (FIGS. 6, 9, and 12) to extend the forked member 142 into engagement with a drive pin 143. When engaged, the distal end of member 142 trips the actuating lever 342 of a limit switch LS-9 to energize a suitable circuit including a solenoid-operated fluid control valve controlling operation of cylinder 152 to extend piston rod 151 and swing the swivel arm assembly 136 and thereby forked member 142 a predetermined distance. This indexes the base member 88 and tray 75 supported thereon to present the next succeeding loaded chute 81 into feeding position in registry with block 117 and discharge opening 112. The gravity fed mounts, assited by air flotation via conduit 113 and orifice 115, slide onto the upper surface 116 of block 117 to engage the contacts 129 and overlie the outlet of sensor tube 134. This effects operation of cylinder 140 to retract the piston rod 141 and disengage forked member 142 from the drive pin 143. Disengagement of member 142 from actuating lever 342 opens the limit switch LS-9 to effect retraction of piston rod 151 and return the swivel plate assembly 136 to its starting position in readiness for the next indexing cycle. This operation is repeated each time a chute 81 is emptied of its mounts M.

As the base member 88 reaches the end of its travel on tracks 86 and 87 by the indexing movement described above to position the last loaded chute 81 in registry with the discharge outlet 112, it engages the actuating arm 343 of a limit switch LS-10 to close a circuit energizing a red warning light, indicating that only one row of mounts remains in the tray 75. When this last row is emptied, an audible alarm is sounded to warn the attendant that the tray 75 is empty and should be replaced by a fresh one. The table 95 is then lowered and actuates a suitable limit switch on base member 88 to de-activate the audible alarm and the tray indexing mechanism until the empty tray is replaced by a fresh one loaded with mirror mounts M. The base member 88 can then be returned to its initial starting position by manually pulling on U-shaped handle 345 and table 95 can be raised to its inclined position (FIGS. 5 and 6) in readiness for another series of mount feeding operations.

From the foregoing, it is apparent that the objects of the present invention have been fully accomplished. A novel apparatus is provided for automatically applying heated mirror mounts accurately, rapidly and smoothly to antenna-type windshields in a continuous assembly line operation in which the windshields are moved bodily at spaced intervals in a horizontal path and elevated thereabove, one at a time, into a desired position within the apparatus. Detecting means, mounted on a carriage movable transversely of such horizontal path, is provided for seeking the location of the windshield antenna wires, which are used as reference lines in positioning the carriage in a manner orienting the mount applying arm carried thereby in a precise location relative to the transverse axis of the windshield. When the carriage reaches the desired position, as determined by the detecting means, a signal is produced to swing the arm and apply a previously heated mirror mount to the windshield and bond the same thereto by heat and pressure. The mirror mounts are fed singly from a supply of such mounts to said mount applying arm while the carriage is in its initial position prior to traversing such path. Each mirror mount is heated at a station intermediate said supply and said mount applying arm during its transit therebetween. The multiple operations are effected sequentially in a timed relation.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. Apparatus for applying a mirror mount on a windshield comprising: a frame; means on said frame for supporting a windshield in a generally horizontal plane; a carriage mounted on said frame for movement relative thereto transversely across said windshield supporting means; means including a press member mounted on said carriage for receiving a mirror mount; means for locating said carriage relative to said windshield in a position orienting said press member is a desired relation to said windshield; and means for actuating said press member upon attainment of said desired relation to apply said mirror mount in a desired region on said windshield.

2. Apparatus according to claim 1, wherein said windshield is provided with reference indicia and said carriage locating means includes means on said carriage for detecting said reference indicia during traverse of said carriage across said windshield; and means responsive to said detecting means for controlling movement of said carriage to locate said press member in a desired relation to said reference indicia.

3. Apparatus according to claim 2, wherein said reference indicia comprises at least one antenna wire embedded in said windshield.

4. Apparatus according to claim 2, including means for resiliently mounting said detecting means on said carriage for limited movement relative thereto; and means for moving said detecting means relative to said carriage during said transverse movement thereof.

5. Apparatus according to claim 1, including means for feeding a single mirror mount from a supply of such mounts to said press member.

6. Apparatus according to claim 5, including a tray for storing said supply of mounts; said tray having a plurality of side-by-side related, open-ended chutes for containing rows of said mounts, respectively.

7. Apparatus according to claim 6, including a tiltable base member for supporting said tray in an inclined position disposing said chute open ends downwardly and barrier means extending transversely across the open ends of said chutes for restraining said mirror mounts therein; said barrier means having an opening therein providing a discharge outlet for each row of mounts as such row reaches the discharge position.

8. Apparatus according to claim 7, including means for indexing said tray to present succeeding chutes in alignment with said barrier means opening.

9. Apparatus according to claim 5, wherein said feeding means comprises an upper ramp and a lower ramp angularly related to and vertically spaced from each other for reorienting said mounts during delivery from said supply to said press member.

10. Apparatus according to claim 9, wherein said feeding means includes a transfer arm interposed between said upper and lower ramps and mounted on said frame for pivotal movement about a horizontal axis between said upper and lower ramps.

11. Apparatus according to claim 9, including means on said lower ramp for releasing a single mount only from a series of mounts stacked thereon for ultimate delivery to said press member.

12. Apparatus according to claim 11, including means on said lower ramp downstream of said releasing means for heating said single mount prior to delivery to said press member.

13. Apparatus according to claim 1, wherein said press member comprises an arm pivotally mounted at one end on said carriage about a horizontal axis and provided at the other end with a socket member having a cavity for accommodating a single mount; said actuating means including means for pivoting said arm between an upper position receiving a mirror mount and a lower position pressing said mount against said windshield upper surface.

14. Apparatus according to claim 13, including vacuum means comprising a source of vacuum and passage means in said socket member establishing communication between said vacuum source and said socket member cavity to retain said mount therein during pivotal movement of said arm.

15. Apparatus according to claim 13, including a seal ring assembly mounted on said carriage for pivotal movement about said horizontal axis and disposed in spaced relation above said windshield supporting means in the path of arcuate movement of said socket member for engagement thereby and movement therewith into sealing engagement against said windshield upper surface.

16. Apparatus according to claim 15, wherein said socket member, said seal ring assembly and said windshield define a compartment completely enclosing said mount; and means establishing a vacuum in said compartment during the pressing of said mount to said windshield.

17. Apparatus according to claim 1, including means on said frame for heating individual mirror mounts prior to delivery thereof to said press member.

18. Apparatus according to claim 1, in combination with a conveyor for moving windshields substantially continuously at spaced intervals along a substantially horizontal path toward said windshield supporting means.

19. Apparatus according to claim 18, wherein said windshield supporting means comprises an elevator; and means for raising and lowering said elevator between a lower position below said conveyor and an upper position thereabove to lift individual windshields off said conveyor for proper vertical positioning relative to said press member.

20. Apparatus according to claim 19, including means responsive to a predetermined upward movement of said elevator for initiating movement of said carriage in a direction transversely of said horizontal path.

21. Apparatus according to claim 19, including at least one stop member on said elevator; and conveying means on said elevator for advancing a windshield thereon against said stop to locate said windshield in a desired longitudinal position relative to said carriage.

22. Apparatus according to claim 18, including means on said frame for heating individual mirror mounts prior to the delivery thereof to said press member; and means responsive to the advancement of said windshield on said conveyor for energizing said heating means.

23. Apparatus for securing a mirror mount on a windshield comprising: a frame; means on said frame for supporting a windshield provided with reference indicia therein in a generally horizontal plane; a carriage; means for moving said carriage transversely across said windshield supporting means; a press arm mounted on said carriage for pivotal movement about a horizontal axis between an upper position receiving a mirror mount and a lower position pressing said mount against said windshield; means on said carriage for detecting the location of said indicia on said windshield during traverse of said carriage thereacross; means responsive to said detecting means for controlling movement of said carriage to locate said arm relative to said indicia; and means for actuating said arm from said upper position to said lower position to apply said mount in a desired region on said windshield.

24. Apparatus according to claim 23, including means for feeding a single mirror mount from a supply of such mounts to said press arm when in said upper mount receiving position prior to carriage movement.

25. Apparatus according to claim 23, including means on said frame for heating individual mirror mounts prior to delivery to said press arm.

26. Apparatus according to claim 23, wherein said press arm is provided with a socket member at the end opposite said horizontal axis; said socket member having a cavity for receiving a single mirror mount.

27. Apparatus according to claim 26, including means retaining said mount in said cavity during pivotal movement of said press arm toward said lower position.

28. Apparatus according to claim 26, including a seal ring assembly mounted on said carriage for pivotal movement about said horizontal axis and disposed in spaced relation above said windshield supporting means in the path of arcuate movement of said socket member for engagement thereby and movement therewith into sealing engagement against said windshield.

29. Apparatus according to claim 28, wherein said socket member, said seal ring assembly and said windshield define a compartment completely enclosing said mount; and means establishing a vacuum in said compartment during the pressing of said mount to said windshield.

30. Apparatus according to claim 23, wherein said detecting means includes a scanning device resiliently mounted on said carriage for limited movement relative thereto, and means for moving said scanning device relative to said carriage during said transverse movement thereof.

31. Apparatus according to claim 30, wherein said moving means comprises an elongated cam having an inclined surface extending transversely across said frame and a cam follower connected to said scanning device and guided for movement on said inclined surface.

32. Apparatus according to claim 13, including means for adjusting the inclination of said cam surface.

33. Apparatus according to claim 23, in combination with a conveyor for moving windshields substantially continuously at spaced intervals along a substantially horizontal path toward said windshield supporting means; and means for raising and lowering said windshield supporting means between a lower position below said conveyor and an upper position thereabove to lift individual windshields off said conveyor.

34. Apparatus according to claim 33, including means responsive to a predetermined upward movement of said windshield supporting means for initiating movement of said carriage in a direction transversely of said horizontal path.

35. Apparatus according to claim 34, including means on said frame for heating individual mirror mounts prior to the delivery thereof to said press arm; and means responsive to the advancement of said windshield on said conveyor for energizing said heating means.

* * * * *

UNITED STATES PATENT AND TRADEMARK OFFICE

CERTIFICATE OF CORRECTION

PATENT NO. : 3,948,719

DATED : April 6, 1976

INVENTOR(S) : Robert R. Beckham

It is certified that error appears in the above-identified patent and that said Letters Patent are hereby corrected as shown below:

Col. 3, line 38, "layers" should be --layered--
Col. 6, line 48, "it" should be --in--
Col. 10, line 30, "onn" should be --on--
Col. 11, line 52, "of" should be --for--
line 65, "part" should be --path--
line 68, "inverter" should be --inverted--
Col. 12, line 11, "relations" should be --relation--
Col. 19, line 35, "is" should be --in--
Col. 22, line 26, "13" should be --31--

Signed and Sealed this

Fifth Day of October 1976

[SEAL]

*Attest:*

RUTH C. MASON
*Attesting Officer*

C. MARSHALL DANN
*Commissioner of Patents and Trademarks*